(12) United States Patent
Kikkawa

(10) Patent No.: US 9,432,628 B2
(45) Date of Patent: Aug. 30, 2016

(54) INFORMATION PROCESSING DEVICE, INFORMATION PROCESSING METHOD, AND COMPUTER PROGRAM

(75) Inventor: Norifumi Kikkawa, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 775 days.

(21) Appl. No.: 12/303,868

(22) PCT Filed: May 28, 2007

(86) PCT No.: PCT/JP2007/060773
§ 371 (c)(1),
(2), (4) Date: Jun. 2, 2010

(87) PCT Pub. No.: WO2007/145069
PCT Pub. Date: Dec. 21, 2007

(65) Prior Publication Data
US 2010/0235428 A1    Sep. 16, 2010

(30) Foreign Application Priority Data

Jun. 15, 2006  (JP) .................................. 2006-166350

(51) Int. Cl.
*G06F 15/16* (2006.01)
*H04N 7/173* (2011.01)
(Continued)

(52) U.S. Cl.
CPC ........... *H04N 7/17318* (2013.01); *H04N 5/765* (2013.01); *H04N 7/163* (2013.01); *H04N 21/4135* (2013.01); *H04N 21/4334* (2013.01);
(Continued)

(58) Field of Classification Search
CPC .................................................. H04N 7/17318
USPC .......................................................... 709/203
See application file for complete search history.

(56) References Cited

U.S. PATENT DOCUMENTS 7,639,619 B2 * 12/2009 Xu .................................. 370/235
7,647,385 B2 *  1/2010 Encarnacion et al. ......... 709/217
(Continued)

FOREIGN PATENT DOCUMENTS

CN          1625242      6/2004
JP          2001-101114  4/2001
(Continued)

OTHER PUBLICATIONS

Yahoo!, Inc. "Yahoo! Briefcase Help", downloaded from archive. org, 2005, 8 pages.*
(Continued)

*Primary Examiner* — Jerry Dennison
(74) *Attorney, Agent, or Firm* — Finnegan, Henderson, Farabow, Garrett & Dunner, L.L.P.

(57) ABSTRACT

There are provided a device and a method enabling execution of recording of content uploaded from a client with specific storage means of a server being specified. In a content upload process from the client to the server, the client obtains storage destination identifiers corresponding to respective storage means of the server from the server and transmits a content storage request including the storage destination identifier of the storage means desired by the client to the server. The server selects the storage means specified by the storage destination identifier received from the client and stores the uploaded content. With this configuration, the client can arbitrarily specify the specific storage means of the server and allows recording of the content to be executed.

32 Claims, 18 Drawing Sheets

(51) Int. Cl.

| | | |
|---|---|---|
| *H04N 5/765* | (2006.01) | |
| *H04N 7/16* | (2011.01) | |
| *H04N 21/41* | (2011.01) | |
| *H04N 21/433* | (2011.01) | |
| *H04N 21/436* | (2011.01) | |
| *H04N 21/8543* | (2011.01) | |
| *H04N 5/775* | (2006.01) | |
| *H04N 5/781* | (2006.01) | |
| *H04N 5/85* | (2006.01) | |

(52) U.S. Cl.
CPC ..... *H04N 21/43615* (2013.01); *H04N 21/8543* (2013.01); *H04N 5/775* (2013.01); *H04N 5/781* (2013.01); *H04N 5/85* (2013.01)

(56) References Cited

U.S. PATENT DOCUMENTS

| | | | |
|---|---|---|---|
| 7,668,939 B2 * | 2/2010 | Encarnacion et al. | 709/220 |
| 7,680,804 B2 * | 3/2010 | Upendran et al. | 707/999.1 |
| 7,725,431 B2 * | 5/2010 | Myllyla et al. | 707/610 |
| 2004/0044746 A1 | 3/2004 | Matsusaka | |
| 2004/0054963 A1 | 3/2004 | Kobayashi | |
| 2005/0278755 A1 * | 12/2005 | Kuo et al. | 725/80 |
| 2006/0067489 A1 * | 3/2006 | Morioka | 379/93.12 |
| 2006/0068911 A1 * | 3/2006 | Pirich et al. | 463/40 |
| 2006/0282514 A1 * | 12/2006 | Saint-Hilaire et al. | 709/218 |
| 2008/0028088 A1 * | 1/2008 | Walter et al. | 709/230 |
| 2008/0201723 A1 * | 8/2008 | Bottaro et al. | 719/316 |
| 2010/0074600 A1 | 3/2010 | Putterman | |

FOREIGN PATENT DOCUMENTS

| | | |
|---|---|---|
| JP | 2004-102334 | 4/2004 |
| JP | 2004-110207 | 4/2004 |
| JP | 2004-348455 | 12/2004 |
| JP | 2006-074541 | 3/2006 |
| JP | 2006-74541 | 3/2006 |
| KR | 20050104358 A | 11/2005 |
| KR | 20060002962 A | 1/2006 |
| WO | WO-2005-067300 | 7/2005 |

OTHER PUBLICATIONS

Postel, J. and Reynolds, J. "Request for Comments (RFC) 959: File Transfer Protocol (FTP)", published by Network Working Group, Oct. 1985, 69 pages.*

Horowitz, M. and Lunt, S. "Request for Comments (RFC) 2228: FTP Security Extensions", published by Network Working Group, Oct. 1997, 27 pages.*

Jongwoo Sung et al, "UPnP Based Intelligent Multimedia Service Architecture for Digital Home Network", Apr. 27, 2006, IEEE, NY, NY, 2006 Second International Workshop for Future Embedded and Ubiquitous Systems, pp. 1-6.*

JP 2008-521136 Office Action issued Sep. 11, 2012.

English-language translation of JP 2001-101114 issued Apr. 13, 2001.

English-language translation of JP 2004-102334 issued Apr. 2, 2004.

English-language translation of JP 2004-110207 issued Apr. 8, 2004.

English-language translation of JP 2006-074541 issued Mar. 16, 2006.

JP 2008-521136 Office Action issued Jun. 5, 2012.

Notification of Reasons for Refusal issued in corresponding Japanese Patent Application No. 10-2008-7028684.

Corcoran, Peter, member IEEE and Callahy Frank, Eurocon 2005, "Rapid Prototyping of Networked A/V CE Appliances", Serbin & Montenegro Belgrad, (Nov. 22-24, 2005) pp. 1312-1315.

English-language Supplementary European Search Report in corresponding EP 07 74 4207, mailed Apr. 20, 2011.

First Office Action in Corresponding Chinese Application No. 201110306620.4.

English Language Abstract of CN1625242, which reference was published Jun. 8, 2004.

English Language Abstract of JP 2004-110207, which reference was published Apr. 8, 2004.

* cited by examiner

FIG. 10

```
<Desination Info>
<Destination>
 <Name>BD-DVD Compatible</Name>
 <ID>a1</ID>
 <PossibleTypes>BD/DVD-RW/NONE</PossibleTypes>
 <CurrentType>BD</CurrentType>
 <MaxSize>48000</MaxSize>
 <CurrentSize>23513</CurrentSize>
</Destination>
<Destination>
 <Name>Hard Disc</Name>
 <ID>a2</ID>
 <PossibleTypes>HD</PossibleTypes>
 <CurrentType>HD</CurrentType>
 <MaxSize>160000</MaxSize>
 <CurrentSize>123452</CurrentSize>
</Destination>
..
```

381 (first Destination block)
382 (second Destination block)

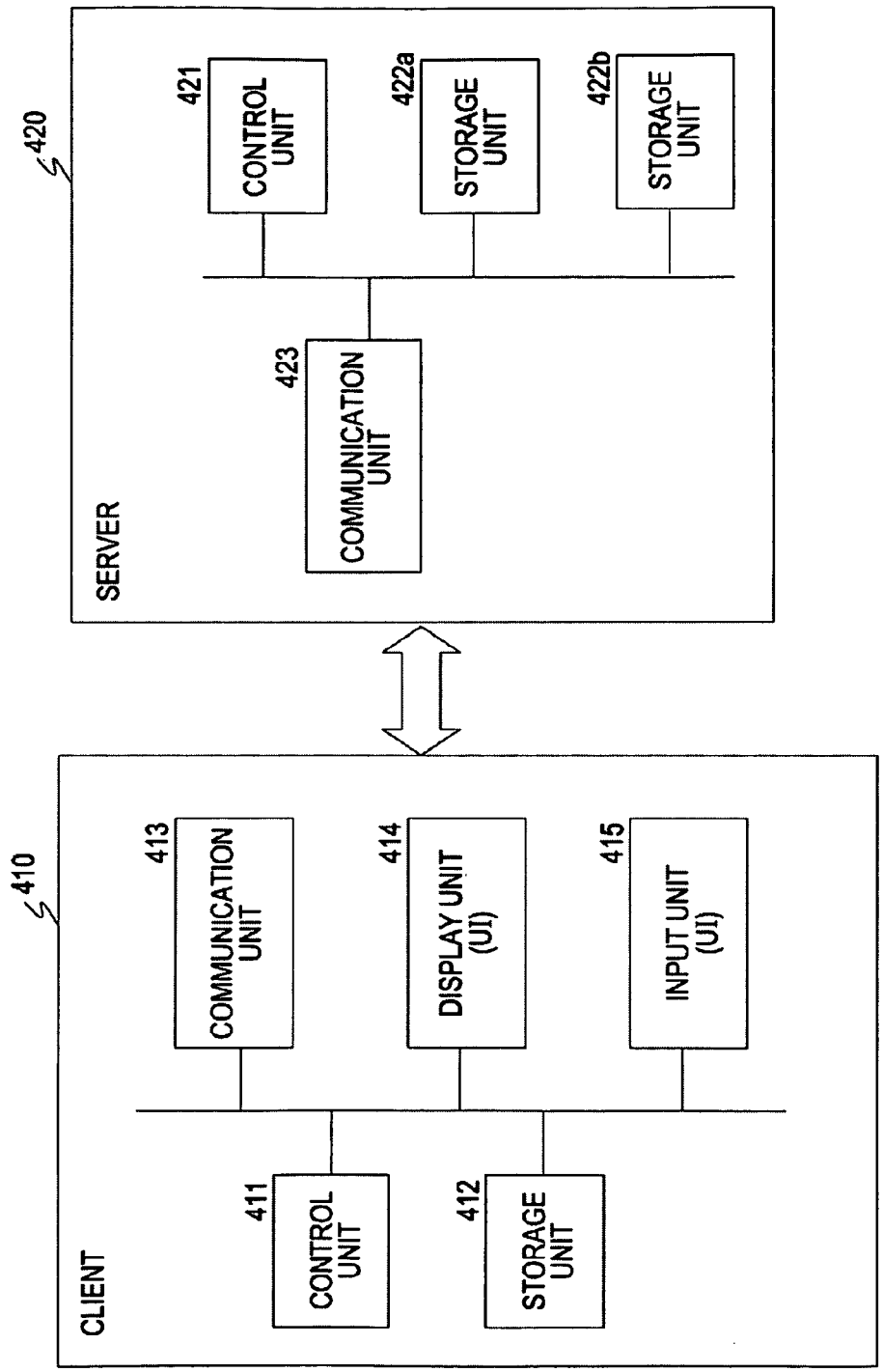

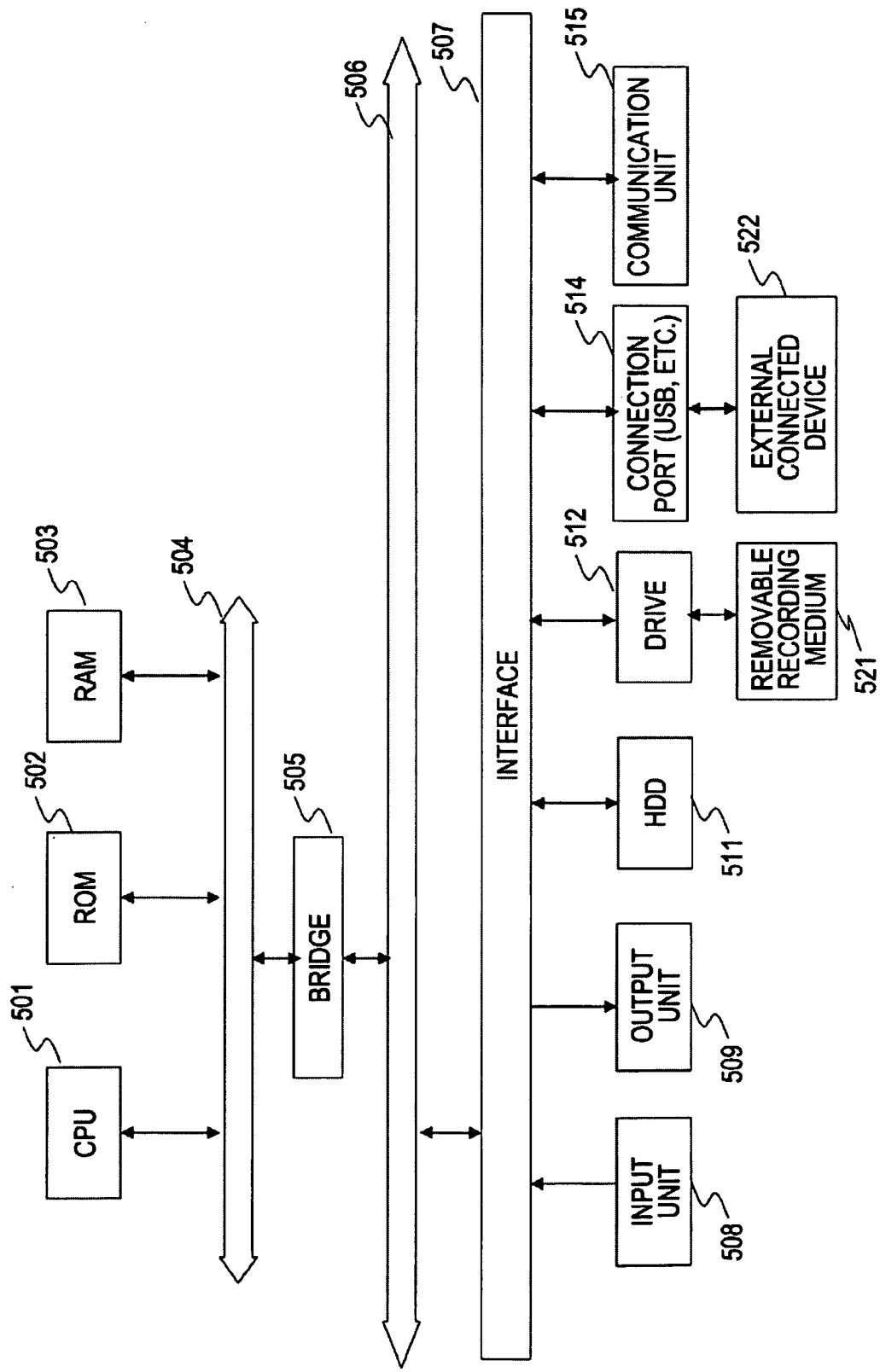

INFORMATION PROCESSING DEVICE, INFORMATION PROCESSING METHOD, AND COMPUTER PROGRAM

TECHNICAL FIELD

The present invention relates to an information processing device, an information processing method, and a computer program that execute a process of transferring and storing content between devices connected to a network.

More specifically, the present invention relates to an information processing device, an information processing method, and a computer program that enable a client to make a content storage request to a server by specifying a content storage destination in a content managing configuration applying a CDS (Content Directory Service) of the server defined by UPnP®.

BACKGROUND ART

Along with the recent popularization of data communication networks, a so-called home network, in which home appliances, computers, and other peripheral devices are connected to a network so that the respective devices can communicate with each other at home, has been becoming widespread. The home network provides a user with convenience and comfort, e.g., communication between devices connected to the network allows share of data processing functions of the respective devices and transmission/reception of content between the devices. The home network is expected to become more and more widespread in the future.

UPnP has been known as a protocol suitable for a configuration of such a home network. UPnP is capable of easily establishing a network without any complicated operation and enables a device connected to the network to receive services provided by respective connected devices without any difficult operation or setting. Also, UPnP has advantages of not depending on an OS (Operating System) on a device and of allowing easy addition of a device.

In UPnP, definition files compatible with XML (eXtensible Markup Language) are exchanged between connected devices, and mutual recognition is performed between the devices. An outline of processes of UPnP is as follows.

(1) Addressing process of obtaining an own device ID, such as an IP address (2) Discovery process of searching for respective devices on a network, receiving responses from the respective devices, and obtaining information included in the responses, such as the type and function of the devices (3) Service requesting process of requesting services to the respective devices on the basis of the information obtained in the discovery process Execution of the above-described process procedure enables provision and receipt of services applying the devices connected to the network. A device newly connected to the network obtains a device ID through the above-described addressing process and obtains information about the other devices connected to the network through the discovery process, thereby being capable of requesting a service to another device on the basis of the obtained information.

For example, a server that stores various pieces of audio and image content and that performs a service of providing a client with the content in response to a request from the client has the CDS (Content Directory Service) as a function of executing a content managing process.

The CDS (Content Directory Service) manages content stored in storage means of the server, e.g., storage means such as a hard disc or a DVD, by using a content managing directory having a hierarchical structure. The CDS (Content Directory Service) holds a content list having a branched-tree hierarchical structure based on unique classification applying metadata corresponding to content, such as a genre and an artist, and executes content management based on the content list.

When content such as audio data or image data managed by the server is to be reproduced in a client, the client transmits a request for obtaining content information to the server. The server presents the content list managed in the CDS to the client, and the client selects desired content from the content list and executes a request for obtaining the content to the server. With this process, the client can obtain the specific content from the server and reproduce it. Incidentally, a configuration of such a process of storing and reproducing content is described in Patent Document 1, for example.

On the other hand, the client can provide the server with content held in a storage unit of the client and set the content as CDS (Content Directory Service)-managed content in the server. This process enables other clients connected to the network to obtain, reproduce, and use the newly stored content. Specifically, for example, the following processes are possible: a process of outputting audio and image content individually obtained by the client via the network to the server and setting the content as server-managed content; and a process of setting image data captured by a digital camera as server-managed content when the client is a digital camera.

However, the server executes content management based on the content list in the CDS, and the client specifies a content storage site in the server on the content list presented by the CDS. Therefore, even when the server holds various storage means such as a hard disc and a DVD, for example, the client cannot request storage of content with specified storage means to the server.

Patent Document 1: Japanese Unexamined Patent Application Publication No. 2004-348455

DISCLOSURE OF INVENTION

Technical Problem

The present invention has been made in view of the above-described circumstances, and an object of the present invention is to provide an information processing device, an information processing method, and a computer program that enable a client to make a content storage request to a server by specifying a content storage destination in a content managing configuration applying the CDS (Content Directory Service) of the server defined by UPnP.

Technical Solution

A first aspect of the present invention is an information processing device to execute a content storing process via a network to a server having a CDS (Content Directory Service) function of executing content management by using a content managing directory having a hierarchical structure. The information processing device is characterized in comprising a communication unit to execute data communication; and a control unit to execute a process of receiving, from the server via the communication unit, storage means information including storage destination identifiers which are identifiers corresponding to respective storage means included in the server and transmitting a content storage request including one of the storage destination identifiers and content to be stored to the server.

Furthermore, in an embodiment of the information processing device according to the present invention, it is characterized in that the control unit has a configuration to execute a process of transmitting, to the server, information to allow the server to associate the content transmitted to the server with a container on the managing directory of the CDS.

Furthermore, in an embodiment of the information processing device according to the present invention, it is characterized in that the control unit has a configuration to execute a process of creating the content storage request including the storage destination identifier corresponding to specified storage means on the basis of input of content storage destination specifying information via an input unit and transmitting the content storage request to the server.

Furthermore, in an embodiment of the information processing device according to the present invention, it is characterized in that the control unit has a configuration to execute a process of obtaining content storage destination specifying information that is recorded as registered information in a storage unit, creating the content storage request including the storage destination identifier corresponding to the obtained registered information, and transmitting the content storage request to the server.

Furthermore, in an embodiment of the information processing device according to the present invention, it is characterized in that the control unit has a configuration to execute a process of creating display information including the storage means information on the basis of the storage means information received from the server and displaying the display information in a display unit.

Furthermore, in an embodiment of the information processing device according to the present invention, it is characterized in that the control unit has a configuration to execute a process of creating display information including storage means names included in the storage means information received from the server and displaying the display information in a display unit.

Furthermore, in an embodiment of the information processing device according to the present invention, it is characterized in that the control unit has a configuration to execute display of a warning to a display unit on the basis of no-medium-set state information to the storage means included in the storage means information received from the server.

Furthermore, in an embodiment of the information processing device according to the present invention, it is characterized in that the control unit has a configuration to execute a process of comparing available capacity of the storage means included in the storage means information received from the server with the amount of content to be stored and to execute display of a warning to a display unit if the available capacity of the storage means is equal to or smaller than the amount of content to be stored.

Furthermore, in an embodiment of the information processing device according to the present invention, it is characterized in that the information processing device is a receiver to execute a process of receiving broadcasted content and outputting the received content to the server as a recorder, and that the control unit has a configuration to execute processes of starting and stopping output of the received content to the recorder in accordance with pre-registered information about estimated time to start and end recording of the broadcasted content to be recorded.

Furthermore, in an embodiment of the information processing device according to the present invention, it is characterized in that the information processing device is a receiver to execute a process of receiving broadcasted content and outputting the received content to the server as a recorder, and that the control unit has a configuration to compare the amount of the broadcasted content to be recorded with available capacity of the storage means included in the storage means information received from the recorder and to execute display of a warning to a display unit if the available capacity of the storage means is equal to or smaller than the amount of content to be stored.

Furthermore, a second aspect of the present invention is an information processing device as a server to execute a process in response to a content storage request from a client via a network. The information processing device is characterized in comprising a communication unit to execute data communication; and a control unit to execute a CDS (Content Directory Service) function of performing content management by using a content managing directory having a hierarchical structure, and also characterized in that the control unit has a configuration to execute a content storing process by receiving the content storage request including a storage destination identifier which is an identifier corresponding to storage means included in the server from the client via the communication unit and selecting the storage means corresponding to the storage destination identifier as a storage destination of content transmitted from the client.

Furthermore, in an embodiment of the information processing device according to the present invention, it is characterized in that the control unit has a configuration to execute a process of transmitting, to the client, storage means information including storage destination identifiers which are identifiers corresponding to respective storage means included in the server in accordance with receipt of a storage means information obtaining request from the client.

Furthermore, in an embodiment of the information processing device according to the present invention, it is characterized in that the control unit has a configuration to execute a process of transmitting, to the client, storage means information including information about media that can be set to the storage means included in the server and information about a current medium that is set in the storage means in accordance with receipt of a storage means information obtaining request from the client.

Furthermore, in an embodiment of the information processing device according to the present invention, it is characterized in that the control unit has a configuration to execute a process of transmitting, to the client, storage means information including information about capacity of a medium set in the storage means included in the server in accordance with receipt of a storage means information obtaining request from the client.

Furthermore, in an embodiment of the information processing device according to the present invention, it is characterized in that the information processing device is a recorder and the client is a receiver to execute a process of receiving broadcasted content and outputting the received content to the server as the recorder, and that the control unit has a configuration to execute processes of starting and stopping input of content from the receiver in accordance with pre-registered information about estimated time to start and end recording of the broadcasted content to be recorded.

Furthermore, a third aspect of the present invention is an information processing method in an information processing device to execute a content storing process via a network to a server having a CDS (Content Directory Service) function of executing content management by using a content managing directory having a hierarchical structure. The information processing method is characterized in comprising a storage means information inputting step of inputting, in a control unit, storage means information that is received from the server via a communication unit and that includes storage destination identifiers which are identifiers corresponding to respective storage means included in the server; and a data transmitting step of executing, in the control unit, a process of transmitting a content storage request including one of the storage destination identifiers and content to be stored to the server via the communication unit.

Furthermore, in an embodiment of the information processing method according to the present invention, is characterized in that the data transmitting step includes a step of executing a process of transmitting, to the server, information to allow the server to associate the content transmitted to the server with a container on the managing directory of the CDS.

Furthermore, in an embodiment of the information processing method according to the present invention, it is characterized in that the data transmitting step is a step of executing a process of creating the content storage request including the storage destination identifier corresponding to specified storage means on the basis of input of content storage destination specifying information via an input unit and transmitting the content storage request to the server.

Furthermore, in an embodiment of the information processing method according to the present invention, it is characterized in that the data transmitting step is a step of executing a process of obtaining content storage destination specifying information that is recorded as registered information in a storage unit, creating the content storage request including the storage destination identifier corresponding to the obtained registered information, and transmitting the content storage request to the server.

Furthermore, in an embodiment of the information processing method according to the present invention, it is characterized in that the information processing method further comprises a display step of executing, in the control unit, a process of creating display information including the storage means information on the basis of the storage means information received from the server and displaying the display information in a display unit.

Furthermore, in an embodiment of the information processing method according to the present invention, it is characterized in that the information processing method further comprises a display step of executing, in the control unit, a process of creating display information including storage means names included in the storage means information received from the server and displaying the display information in a display unit.

Furthermore, in an embodiment of the information processing method according to the present invention, it is characterized in that the information processing method further comprises a display step of executing, in the control unit, display of a warning to a display unit on the basis of no-medium-set state information to the storage means included in the storage means information received from the server.

Furthermore, in an embodiment of the information processing method according to the present invention, it is characterized in that the information processing method further comprises a display step of executing, in the control unit, a process of comparing available capacity of the storage means included in the storage means information received from the server with the amount of content to be stored and display of a warning to a display unit if the available capacity of the storage means is equal to or smaller than the amount of content to be stored.

Furthermore, in an embodiment of the information processing method according to the present invention, it is characterized in that the information processing device is a receiver to execute a process of receiving broadcasted content and outputting the received content to the server as a recorder, and that the control unit executes processes of starting and stopping output of the received content to the recorder in accordance with pre-registered information about estimated time to start and end recording of the broadcasted content to be recorded.

Furthermore, in an embodiment of the information processing method according to the present invention, it is characterized in that the information processing device is a receiver to execute a process of receiving broadcasted content and outputting the received content to the server as a recorder, and that the control unit compares the amount of the broadcasted content to be recorded with available capacity of the storage means included in the storage means information received from the recorder and executes display of a warning to a display unit if the available capacity of the storage means is equal to or smaller than the amount of content to be stored.

Furthermore, a fourth aspect of the present invention is an information processing method executed in an information processing device as a server to execute a process in response to a content storage request from a client via a network. The information processing method is characterized in comprising a content storage request receiving step of receiving, in a communication unit, a content storage request including a storage destination identifier which is an identifier corresponding to storage means included in the server from the client; a content storing step of selecting the storage means corresponding to the storage destination identifier as a storage destination of content transmitted from the client and executing a process of storing the content received from the client in a control unit; and a step of associating, in the control unit, the content received from the client with a content managing directory in accordance with a CDS (Content Directory Service) function to execute content management by using the content managing directory having a hierarchical structure.

Furthermore, in an embodiment of the information processing method according to the present invention, it is characterized in that the information processing method further comprises a storage means information transmitting step of transmitting, to the client, storage means information including storage destination identifiers which are identifiers corresponding to respective storage means included in the server in accordance with receipt of a storage means information obtaining request from the client in the control unit.

Furthermore, in an embodiment of the information processing method according to the present invention, it is characterized in that the information processing method further comprises a storage means information transmitting step of transmitting, to the client, storage means information including information about media that can be set to the storage means included in the server and information about a current medium that is set in the storage means in accordance with receipt of a storage means information obtaining request from the client in the control unit.

Furthermore, in an embodiment of the information processing method according to the present invention, it is characterized in that the information processing method further comprises a storage means information transmitting step of transmitting, to the client, storage means information including information about capacity of a medium set in the storage means included in the server in accordance with receipt of a storage means information obtaining request from the client in the control unit.

Furthermore, in an embodiment of the information processing method according to the present invention, it is characterized in that the information processing device is a recorder and the client is a receiver to execute a process of receiving broadcasted content and outputting the received content to the server as the recorder, and that the control unit executes processes of starting and stopping input of content from the receiver in accordance with pre-registered information about estimated time to start and end recording of the broadcasted content to be recorded.

Furthermore, a fifth aspect of the present invention is a computer program allowing information processing to be executed in an information processing device to execute a content storing process via a network to a server having a CDS (Content Directory Service) function of executing content management by using a content managing directory having a hierarchical structure. The computer program is characterized in allowing execution of a storage means information inputting step of inputting, in a control unit, storage means information that is received from the server via a communication unit and that includes storage destination identifiers which are identifiers corresponding to respective storage means included in the server; and a data transmitting step of executing, in the control unit, a process of transmitting a content storage request including one of the storage destination identifiers and content to be stored to the server via the communication unit.

Furthermore, a sixth aspect of the present invention is a computer program allowing an information processing device to execute a process in response to a content storage request from a client via a network. The computer program is characterized in allowing execution of a content storage request inputting step of inputting, in a control unit, a content storage request including a storage destination identifier which is an identifier corresponding to storage means included in a server received from the client via a communication unit; a content storing step of selecting the storage means corresponding to the storage destination identifier as a storage destination of content transmitted from the client and executing a process of storing the content received from the client in a control unit; and a step of associating, in the control unit, the content received from the client with a content managing directory in accordance with a CDS (Content Directory Service) function to execute content management by using the content managing directory having a hierarchical structure.

Additionally, the computer program according to the present invention is a computer program that can be provided through a storage medium or a communication medium provided in a computer-readable manner to a multi-purpose computer system capable of executing various program codes, for example, a storage medium such as CD, FD, or MO, or a communication medium such as a network. When such a program is provided in a computer-readable manner, processes according to the program are realized in the computer system.

Further objects, features, and advantages of the present invention will be apparent from more detailed description based on the following embodiment of the present invention and the attached drawings. In this description, the system means a logical group configuration of a plurality of devices and is not limited to devices of respective configurations placed in the same casing.

Advantageous Effects

According to the configuration of an embodiment of the present invention, when a process of uploading content from a client to a server is executed between the client and the server mutually connected via a network, the client obtains storage destination identifiers corresponding to storage means included in the server from the server, and outputs a content storage request including the storage destination identifier corresponding to the storage means desired by the client to the server. The server obtains the storage destination identifier included in the content storage request received from the client, selects the storage means specified by the storage destination identifier, and stores the content uploaded from the client. With this configuration, the client can arbitrarily specify specific storage means of the server and allow the content to be recorded.

BRIEF DESCRIPTION OF DRAWINGS

FIG. 10 is a diagram illustrating an example of storage means information provided from the server to the client in the process of uploading client content to the server.

FIG. 17 is a block diagram illustrating process functions of the client and the server.

FIG. 18 is a diagram illustrating an example of a hardware configuration of an information processing device as the client and the server.

BEST MODE FOR CARRYING OUT THE INVENTION

Hereinafter, details of an information processing device, an information processing method, and a computer program according to the present invention are described with reference to the drawings.

[Outline of System]

Figure 1:
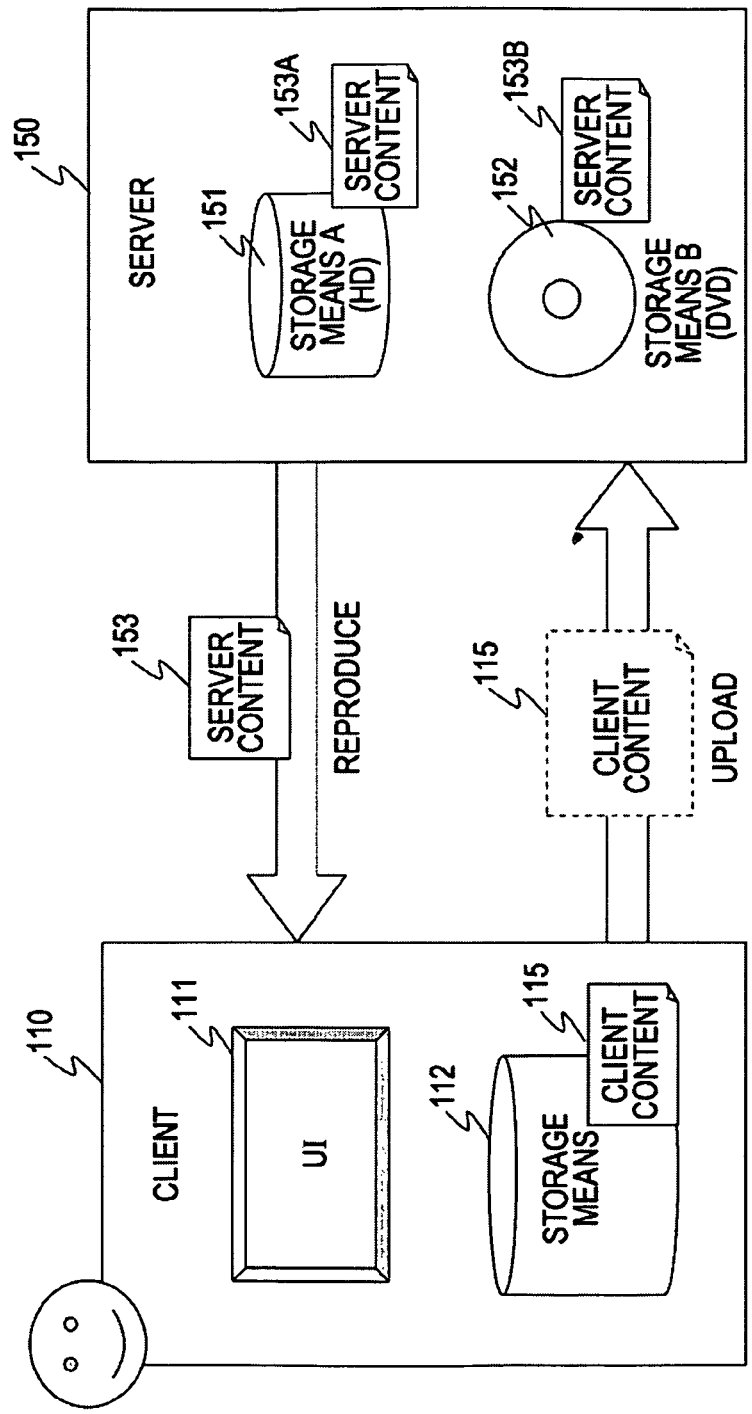
FIG. 1 is a diagram illustrating a process executed between a server and a client connected via a network.

First, an example of a network configuration to which the present invention can be applied is described with reference to FIG. 1. FIG. 1 illustrates a client 110 and a server 150. The client 110 and the server 150 have a configuration capable of performing data communication via a network, such as a home network. Although the figure illustrates only one client and only one server, setting can be made so that other clients and servers not illustrated in the figure can communicate with each other via the network.

The server 150 stores, in storage means A 151 and storage means B 152 such as a hard disc and a DVD, various server content 153A and server content 153B such as audio, image, or video content. The server 150 provides the server content 153 to the client 110 in response to a request from the client 110. For example, the client 110 performs streaming of reproducing the content 153 while receiving it from the server 150.

The client 110 includes a user interface 111 to perform display of a content list and image content provided by the server 150, furthermore, specification of content, a content reproducing request, and a content storage or transmission request to the server 150, for example. Furthermore, the client 110 includes storage means 112 to individually store obtained content and so on by the client 112.

The storage means 112 stores client content 115 held by the client 110, for example. For example, when the client 110 is a digital camera, captured image data or the like is stored as the client content 115. The client 110 can upload the client content 115 to the server 150 in accordance with a predetermined procedure.

The client 110 and the server 150 are constituted as a device complying with a DLNA (Digital Living Network Alliance) guideline that defines specifications of communication via a network and data processing of home information appliances, for example. The DLNA guideline defines a DMS (Digital Media Server) to record, accumulate, and provide content and a DMP (Digital Media Player) to reproduce content. The client 110 illustrated in FIG. 1 corresponds to the DMP. The client 110 searches for the server 150 as a DMS existing in the network and obtains a content list as a list of available content. A user selects content to be watched or listened to from the content list and receives the content from the server 150.

Specifically, the client 110 receives provision of information in accordance with the UPnP protocol and a service from the server 150. UPnP enables easy receipt of a service from a device connected to the network without a complicated operation. In UPnP, definition files compatible with XML (eXtensible Markup Language) are exchanged between connected devices, and mutual recognition is performed between the devices. The processes defined in UPnP include the following processes.

(1) Addressing process of obtaining an own device ID, such as an IP address (2) Discovery process of searching for respective devices on a network, receiving responses from the respective devices, and obtaining information included in the responses, such as the type and function of the devices (3) Service requesting process of requesting services to the respective devices on the basis of the information obtained in the discovery process By performing those processes, the client 110 can receive a service from the server 150. A device newly connected to the network obtains a device ID through the above-described addressing process and obtains information about the other devices connected to the network through the discovery process, thereby being capable of requesting a service to another device on the basis of the obtained information.

[Content Reproducing Process in Client]

Figure 2:
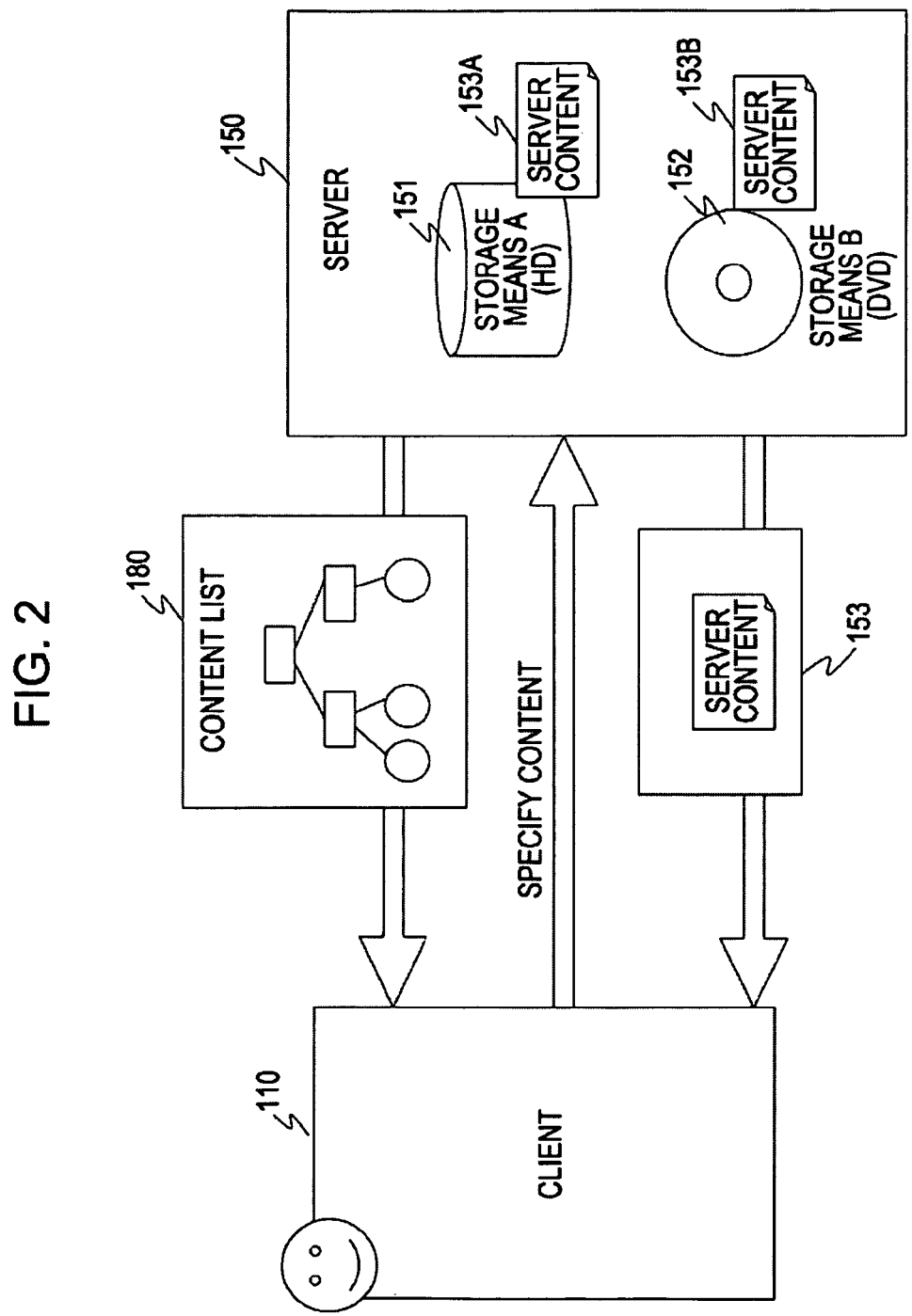
FIG. 2 is a diagram illustrating a process of outputting server content to the client executed between the server and the client connected via the network.

A process of reproducing content stored in the server 150, such as audio data or image data, in the client 110 is described with reference to FIG. 2.

When the client 110 tries to receive and reproduce content stored in the server 150, such as audio data or image data, the client 110 first obtains a content list 180 held by the server 150. In the server 150, content is managed by a CDS (Content Directory Service) in the server by a content managing directory having a hierarchical structure.

Figure 3:
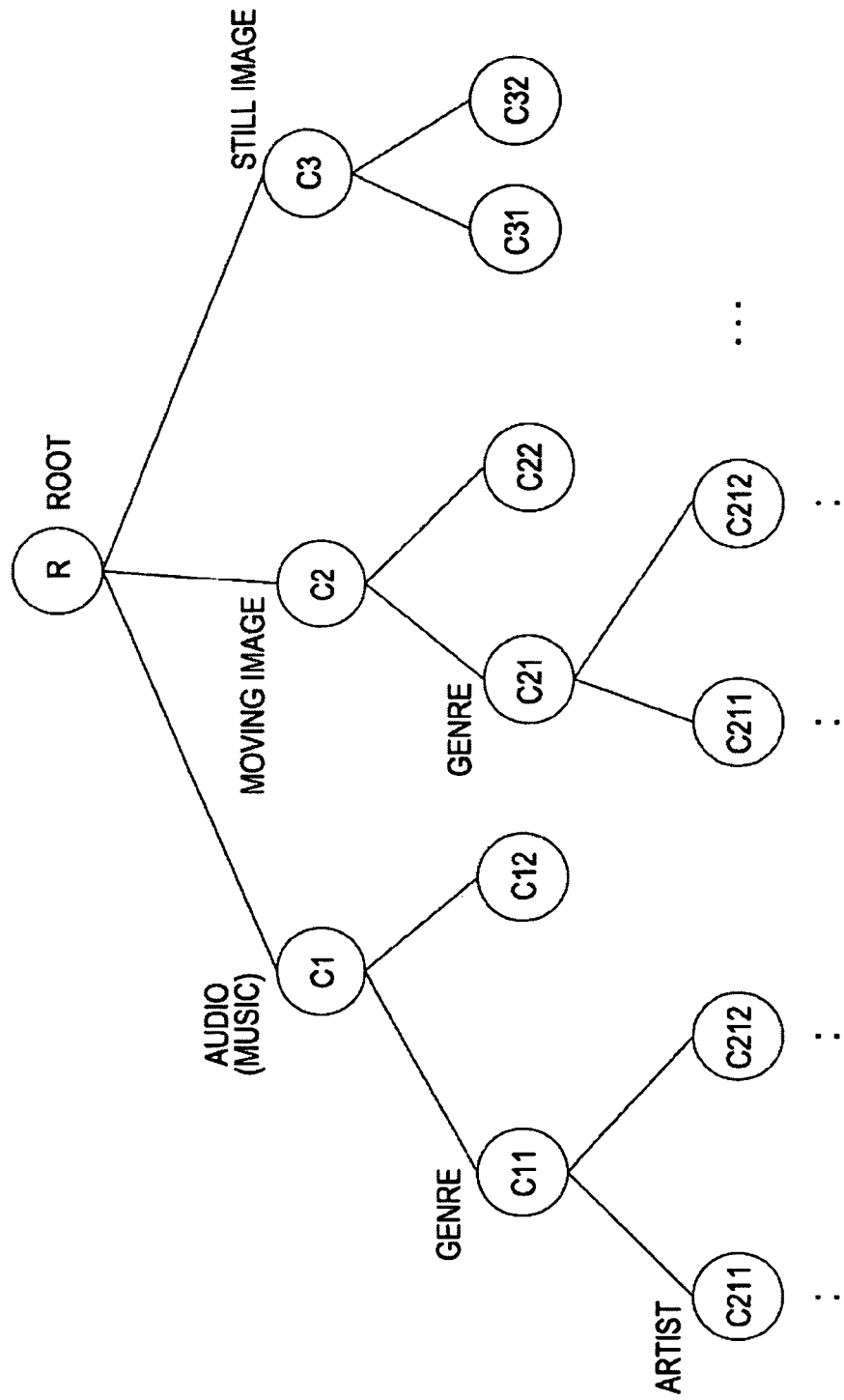
FIG. 3 is a diagram illustrating a content list applied to content management in the server.

An example of a configuration of the content list that is set as the content managing directory managed in the CDS of the server 150 is illustrated in FIG. 3. As illustrated in FIG. 3, content is managed by the content list having a branched-tree hierarchical structure. This hierarchical structure is a logical managing structure corresponding to the content that is managed by being stored in a storage unit by the server.

The content is classified into classes in accordance with the types, e.g., audio, video, and photo. On the basis of the classification, the hierarchical structure illustrated in FIG. 3 is set. The CDS in the server performs classification and establishes the content list having a tree structure in accordance with a program set in advance in the server.

In the hierarchical structure illustrated in FIG. 3, the top is called a root container. Under the root container, an audio (music) container, a moving image container, and a still image container are set, for example. Genre containers are set under the audio (music) container, and artist containers are set under the genre containers. In this way, various containers are set, and content is associated with any of the containers. This classification is an example, and other various classification forms can be used.

Referring back to FIG. 2, the description about the content reproducing process is continued. The client 110 first receives the content list 180 managed by the CDS of the server 150 from the server, selects a piece of content to be reproduced from the content list, and transmits content specifying information to the server 150. The respective pieces of content managed by the CDS of the server 150 are associated with URLs (Uniform Resource Locators), and the client makes a content request to the server 150 by using the URL corresponding to the specific piece of content as specifying information. In response to the content request, the server 150 provides the server storage content 153 to the client 110.

[Content Upload Process from Client to Server]

As described above with reference to FIG. 1, the client 110 can perform upload of the client content 115 held in the storage means 112 of the client 110 to the server 150 in accordance with a predetermined procedure, in addition to the above-described acquisition of content from the server 150 and reproducing of the content.

The client 110 can set the client content 115 as CDS-managed content in the server 150 by uploading it to the server. With this process, other clients connected to the network can obtain, reproduce, and use the newly stored content as server content by executing the process described above with reference to FIG. 2.

For example, a process of storing audio or image content individually obtained by the client 110 via the network in the server 150 and setting the content as content managed by the server 150 can be executed. Also, when the client 110 is a digital camera, a process of setting image data captured by the digital camera as CDS-managed content in the server 150 can be executed.

Figure 4:
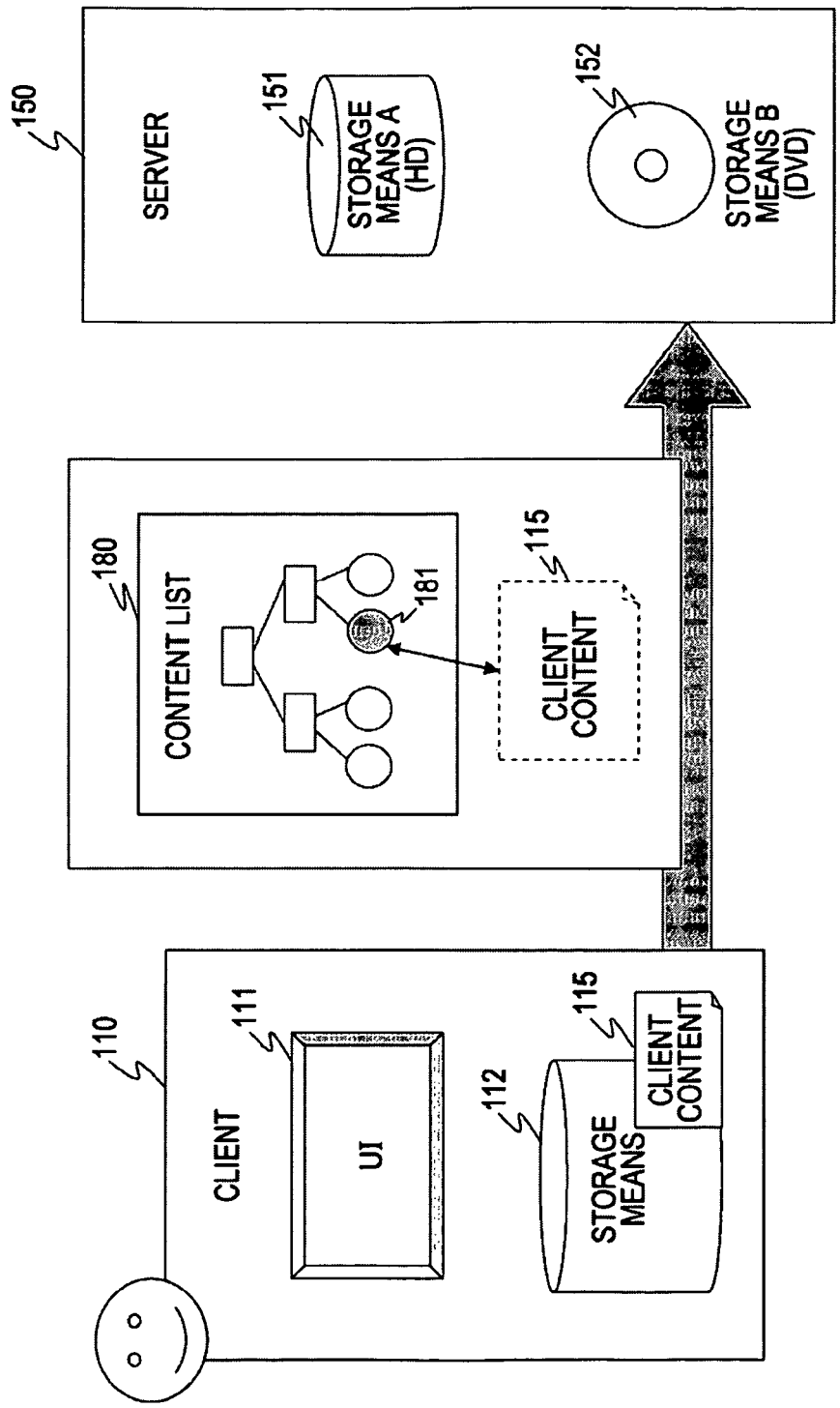
FIG. 4 is a diagram illustrating a process with specification of a position in a content list in a process of uploading client content to the server.

With reference to FIG. 4, a description is given about an example of a process of setting copy data of client-stored content as CDS-managed content in the server, that is, the content upload process. FIG. 4 illustrates a typical processing example based on UPnP AV (UPnP AV Working Committee). As described above, the server 150 executes content management by using the content list in, the CDS. The client 110 can receive the content list 180 from the server 150, specify a specific container in the content list 180 as a setting position of the client content 115, and make a content storage request to the server 150. As illustrated in FIG. 4, for example, the client 110 can specify a container 181 in the content list 180 and make a storage request of the client content 115.

This content upload process is executed in accordance with an action (Create Object Action) set as an action to the CDS defined in UPnP AV. This action is executed as a process of setting a new node of the uploaded content in the content list described above with reference to FIG. 3. Metadata of the uploaded content is associated with the node. The metadata includes the title of the content, media format information, and a content URL. Incidentally, the node is set under the container in the content list.

In response to the content storage request based on the action (Create Object Action) to the CDS, the server 150 receives the client content 113 and stores the received client content 115 in the storage means of the server 150, in the example illustrated in the figure, any of the storage means A 151 and the storage means B 152. Furthermore, the server 150 executes a content list updating process of associating the client content 115 with the specified position on the content list managed by the CDS of the server 150. A URL is set to the stored content, and the URL is associated with the specified position 181 on the content list. The client can obtain the content by obtaining the content list and specifying the URL that is set while being associated with the container.

In this way, the client 110 can execute a content storing process by specifying a specific container in the content list. However, specification of a container on the client side may be a burden on a device on the client side or a user on the client side. For this reason, DLNA also defines a process of not requiring specification of a container on the client side in the action (Create Object Action) to the CDS.

Figure 5:
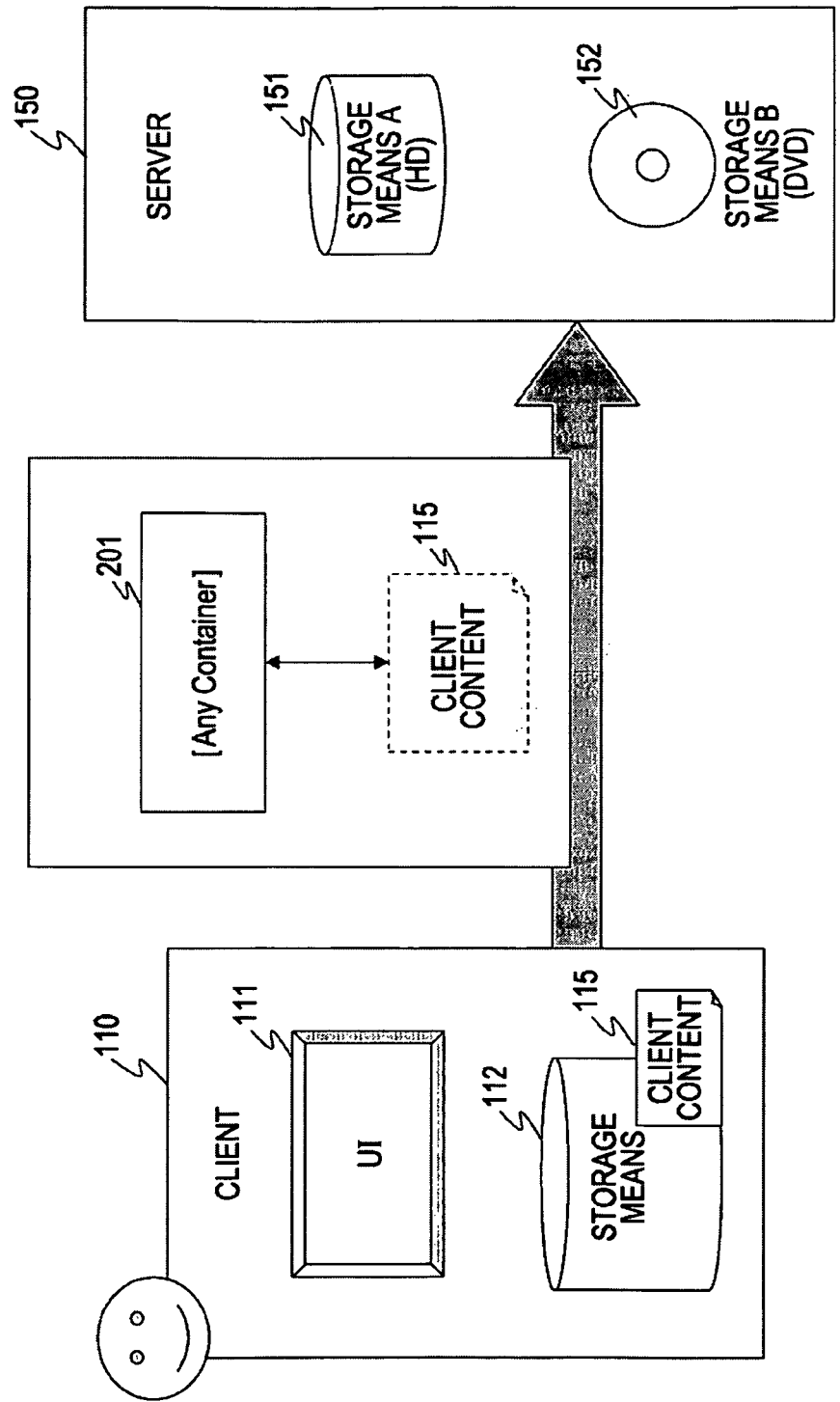
FIG. 5 is a diagram illustrating a process without specification of a position in the content list in the process of uploading client content to the server.

With reference to FIG. 5, a description is given about a process of not requiring specification of a container on the client side. When the client 110 executes an action that is executed as a request for uploading the client content 115 to the server at execution of a request for storing the client content 115 without specification of a specific container in the content list, the client 110 transmits container non-specified information [Any Container] 201 that indicates the absence of content storing content specifying information to the server 150.

When the server 150 receives a CDS action having the container non-specified information [Any Container] 201 from the client 110, the server 150 stores the client content 115 uploaded from the client in the storage means of the server 150, in the example illustrated in the figure, any of the storage means A 151 and the storage means B 152. Furthermore, the server 150 executes the content list updating process of selecting an optimum container position in the content list and associating the client content 115 with the position on the basis of the metadata or the like set to the client content 115. That is, the content setting position on the content list is determined on the server side.

With this process, specification of a container on the client side becomes unnecessary, so that a burden on a device on the client side or a user on the client side reduces.

However, the client 110 cannot specify the storage means of the server 150 as a content storage destination both in the content upload process with specification of a container described above with reference to FIG. 4 and in the content upload process without specification of a container described above with reference to FIG. 5. For example, in the configuration examples described above with reference to FIGS. 4 and 5, the server 150 includes two types of storage means as storage means, that is, the storage means A 151 constituted by a hard disc (HD) and the storage means B 152 constituted by a DVD.

In the content upload process with specification of a container described above with reference to FIG. 4, the client 110 can only specify a container on the content list provided by the CDS of the server 150 and cannot know any relation between the container set in the content list and the storage means of the server, and thus the client 110 cannot know whether the client content 115 has been recorded on the storage means A 151 or the storage means B 152 of the server 150.

Also, in the content upload process without specification of a container described above with reference to FIG. 5, the client 110 cannot know whether the client content 115 has been recorded on the storage means A 151 or the storage means B 152 of the server 150.

As described above, a user who tries to upload content from the client 110 cannot specify a storage destination from the client 110 even when the user wants to record the content on specific storage means of the server 150, e.g., on the DVD.

For example, when the client 110 is a digital camera and when the user wants to record entire content captured by the digital camera by setting the storage destination to the DVD in the server, the content may be stored in a plurality of storage destinations by the server, that is, the content uploaded from the same digital camera may be recorded on the hard disc and the DVD in the above-described process configuration.

In such a configuration, if the DVD is taken out from the server later and if the content captured by the camera is to be reproduced by another DVD player, the following situation can occur, that is, not all data captured by the digital camera can be reproduced from the DVD because part of the content is recorded on the hard disc.

[Content Upload Process from Client to Server with Specification of Storage Destination]

In order to solve the above-described problem, the present invention enables specification of a content storage destination in the server in the content upload process from the client to the server. Hereinafter, an example of this process is described with reference to FIG. 6 and so on. As FIGS. 4 and 5, FIG. 6 illustrates a configuration of a content upload process of the client content 115 from the client 110 to the server 150.

Figure 6:
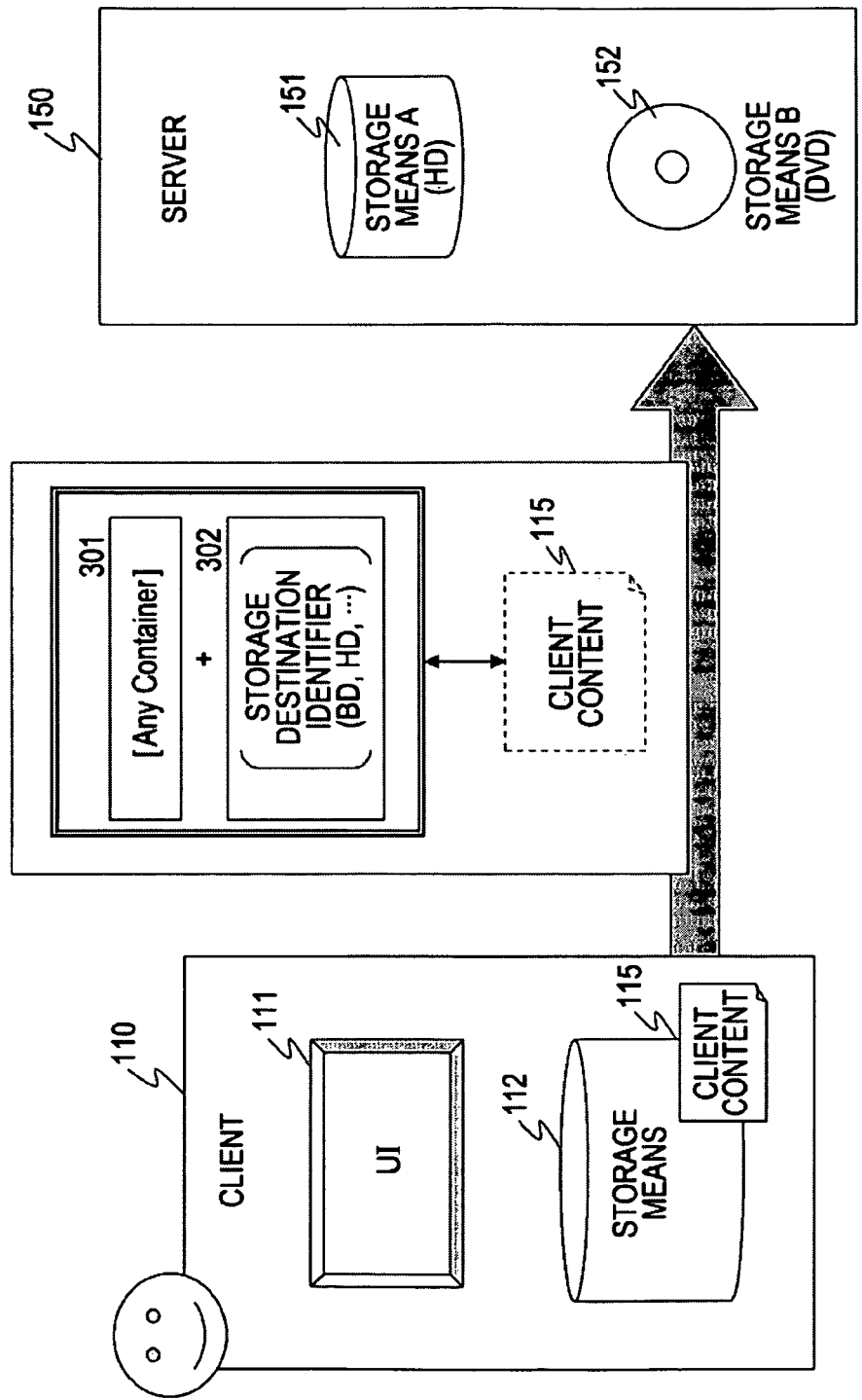
FIG. 6 is a diagram illustrating a process with specification of a storage destination of content in the process of uploading client content to the server.

The process example illustrated in FIG. 6 is a process example in the case of executing an action (Create Object Action) to the CDS including container non-specified information [Any Container] by the client 110, as in the case described above with reference to FIG. 5. As illustrated in FIG. 6, the client 110 transmits a process request using container non-specified information [Any Container] 301 that indicates the absence of content storing content specifying information to the server.

In the content upload process according to the present invention, the client 110 notifies the server 150 of a content storage destination identifier 302 as content storage destination specifying information, in addition to the container non-specified information [Any Container] 301.

The content storage destination identifier 302 is information to specify any of the storage means of the server 150 in which content can be stored. In the example illustrated in FIG.

6, the server 150 includes two types of storage means as storage means, that is, the storage means A 151 constituted by a hard disc (HD) and the storage means B 152 constituted by a DVD. The client 110 notifies the server 150 of the content storage destination identifier 302 as information to specify any of the storage means A 151 and the storage means B 152.

The client 150 executes a process of receiving information about the storage means included in the server 150 from the server 150 in advance, obtaining a storage destination identifier corresponding to specific storage means from storage means information included in the received information, and notifying the server 150 of the obtained storage destination identifier. This process is described in detail below.

As illustrated in FIG. 6, when the server 150 receives the container non-specified information [Any Container] 301 and the content storage destination identifier 302 at the receipt of the client content 115, the server 150 selects the storage means of the server 150 corresponding to the content storage destination identifier 302, selects the selected storage means as a storage destination of the client content 115, and executes a process of recording the client content 115.

Furthermore, the server 150 executes the content list updating process of selecting an optimum container position in the content list and associating the client content 115 therewith on the basis of the metadata that is set to the client content 115.

With this process, the client content 115 is reliably recorded in the storage destination corresponding to the request from the client, for example, any of the storage means A 151 constituted by a hard disc (HD) and the storage means B 152 constituted by a DVD in the server 150 illustrated in FIG. 6, that is, the storage destination desired by the client.

With this process, the user can know the storage destination of the uploaded content in advance. For example, when the client 110 is a digital camera and when the storage destination of the content captured by the digital camera is specified as the DVD in the server, all pieces of the content uploaded from the digital camera are recorded on the DVD. Accordingly, if the user takes out the DVD from the server and enjoys by reproducing the content by another DVD player later, all pieces of the content can be reliably reproduced from the DVD. That is, occurrence of the situation where part of the content is recorded on the hard disc and cannot be reproduced can be prevented, as in the example described above.

As illustrated in FIG. 6, an example of a specific process in the case of executing a process of notifying the server 150 of the content storage destination identifier 302 in addition to the container non-specified information [Any Container] 301 is described with reference to FIG. 7 and so on.

Figure 7:
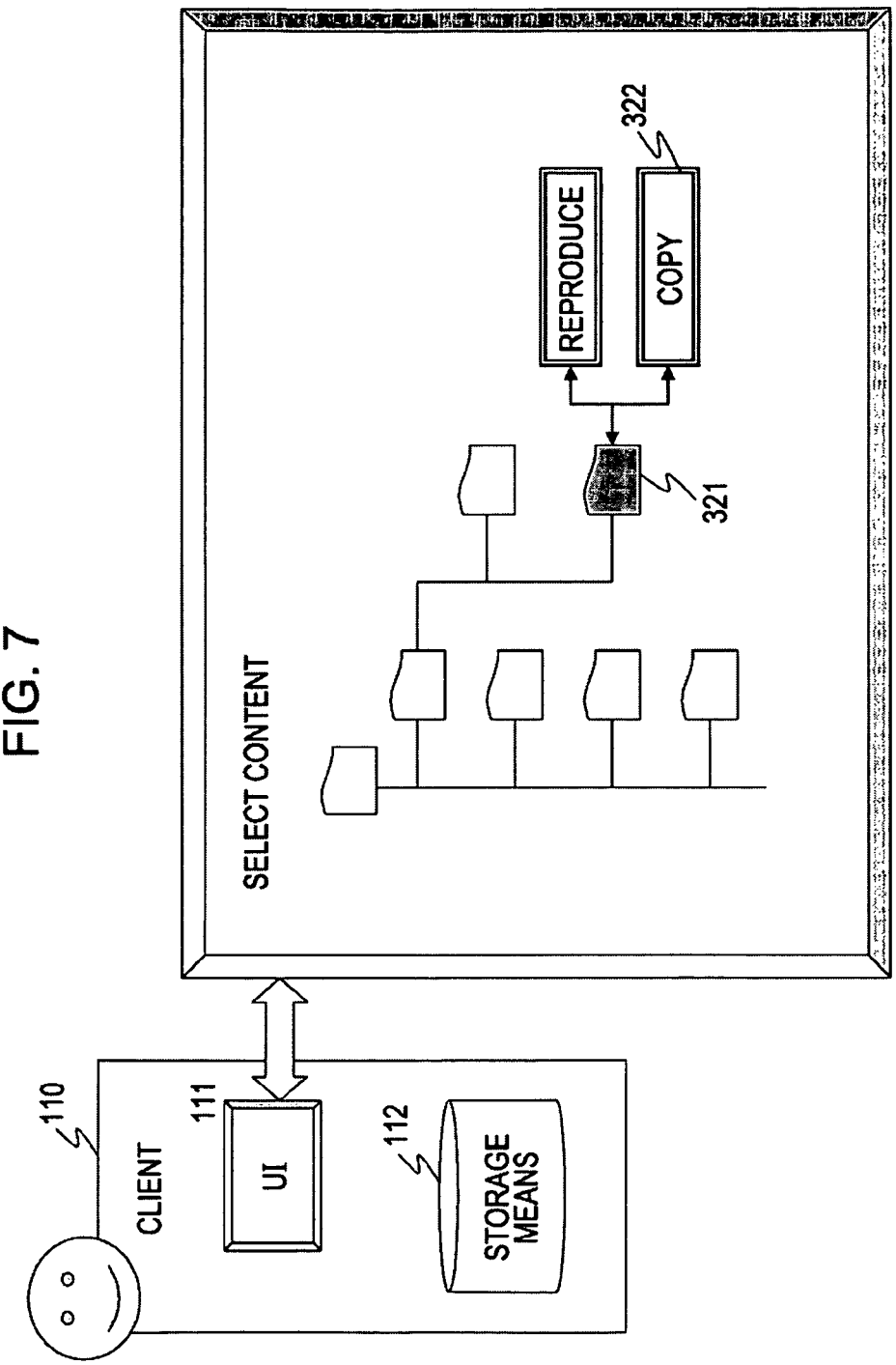
FIG. 7 is a diagram illustrating a display example of a content selecting screen displayed in a UI of the client in the process of uploading client content to the server.

FIG. 7 is a diagram illustrating a content selecting screen that is displayed in the user interface 111 of the client 110 when the content to be uploaded to the server is decided in the client 110. Note that various processes accompanied with various information display processes in the user interface of the client and an upload process described below are executed in the control unit on the client side in accordance with a data processing program stored in advance in the storage unit on the client side.

As illustrated in FIG. 7, a directory structure of the content stored in the storage means 112 of the client 110 is displayed on the content selecting screen. The user selects a piece of content to be uploaded from those pieces of content. The example illustrated in FIG. 7 shows an example where the user has selected content 321. Selection of the content 321 causes process selecting icons for the selected content to be displayed. In the example illustrated in the figure, a [reproduce] icon to reproduce the selected content 321 or a [copy] icon 322 to upload the selected content 321 to the server is displayed. When the user selects the [copy] icon 322, a process of uploading copy data of the selected content 321 to the server is started.

Figure 8:
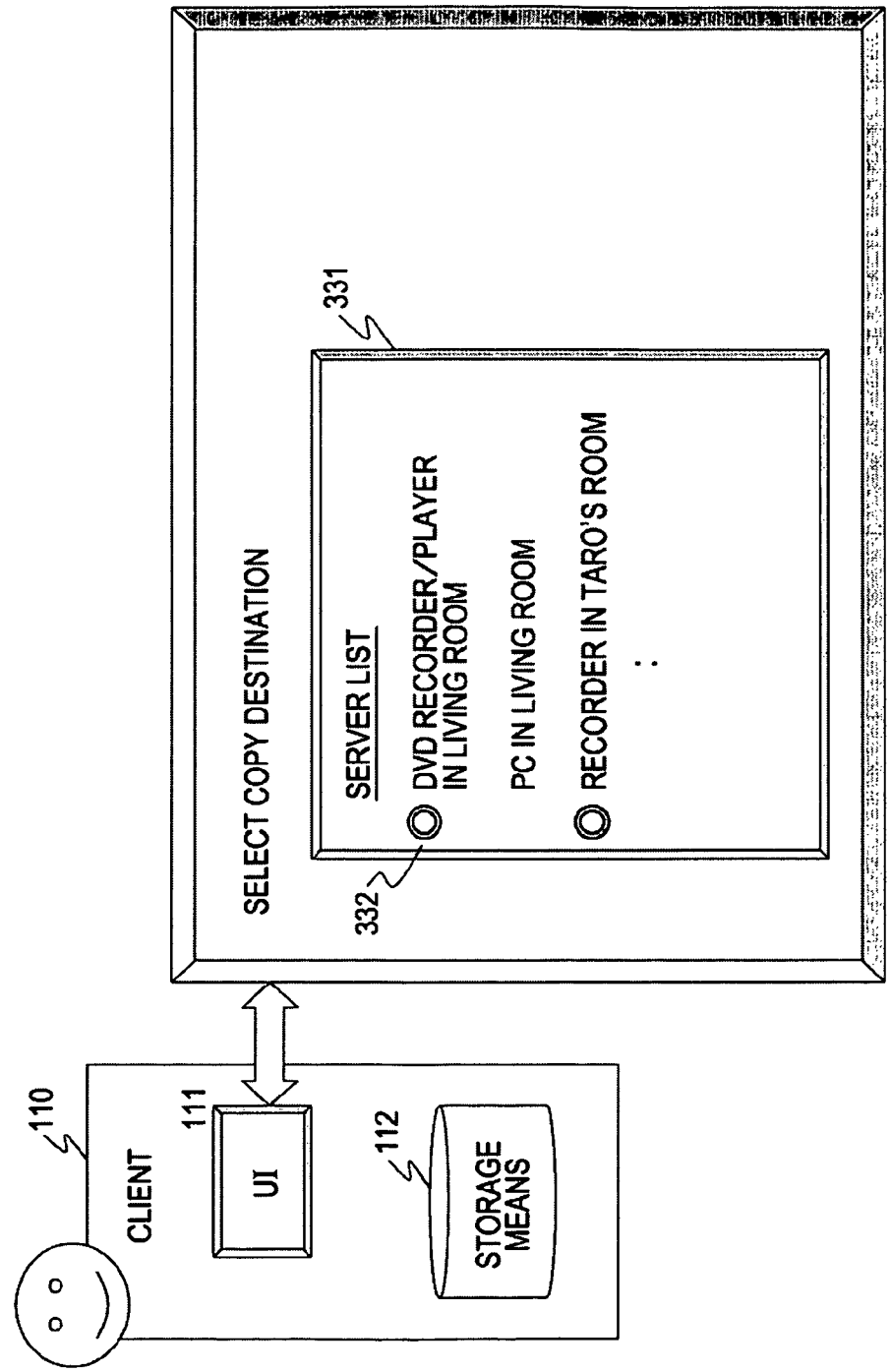
FIG. 8 is a diagram illustrating a display example of a server list displayed in the UI of the client in the process of uploading client content to the server.

When the control unit of the client 110 detects information indicating that the user has selected the [copy] icon 322, the control unit switches the user interface 111 of the client 110 to the screen illustrated in FIG. 8. As illustrated in FIG. 8, a server list 331 as a list of servers that are connected to the client 110 via the network and that can be selected as an upload destination of the content is displayed in the user interface 111 of the client 110.

Note that server information to display the server list 331 is information included in the information received by the client 110 from other devices connected to the network at connection to the network in accordance with the UPnP protocol. As described above, in UPnP, definition files compatible with XML (eXtensible Markup Language) are exchanged between devices connected to the network, mutual recognition is performed between the devices, and search for devices on the network and receipt of device information (Device Description) from the devices are performed. On the basis of the device information, the server list illustrated in FIG. 8 of the servers that can be specified as a content upload destination is presented.

In addition, the server having a function of executing the process described above with reference to FIG. 6 of identifying the content storage destination identifier 302, selecting the content storage destination in accordance with the content storage destination identifier 302, and recording the client content executes transmission by setting an [XML tag] indicating that the server has a content storage destination setting function based on identification of the content storage destination identifier to the device information (Device Description) to be transmitted. A device connected to the network, such as the client, to receive the device information can determine whether each server that has transmitted the device information is a server capable of executing a process corresponding to specification of a storage destination of uploaded content on the basis of this XML tag.

The devices shown in the server list 331 illustrated in FIG. 8 are servers that execute content management based on the above-described CDS, for example. On the basis of the above-described XML tag, an identification mark 332 indicating whether the server is a server capable of specifying a storage destination is displayed. The server with the identification mark 332 is a server capable of executing a process corresponding to specification of a storage destination of uploaded content.

Figure 9:
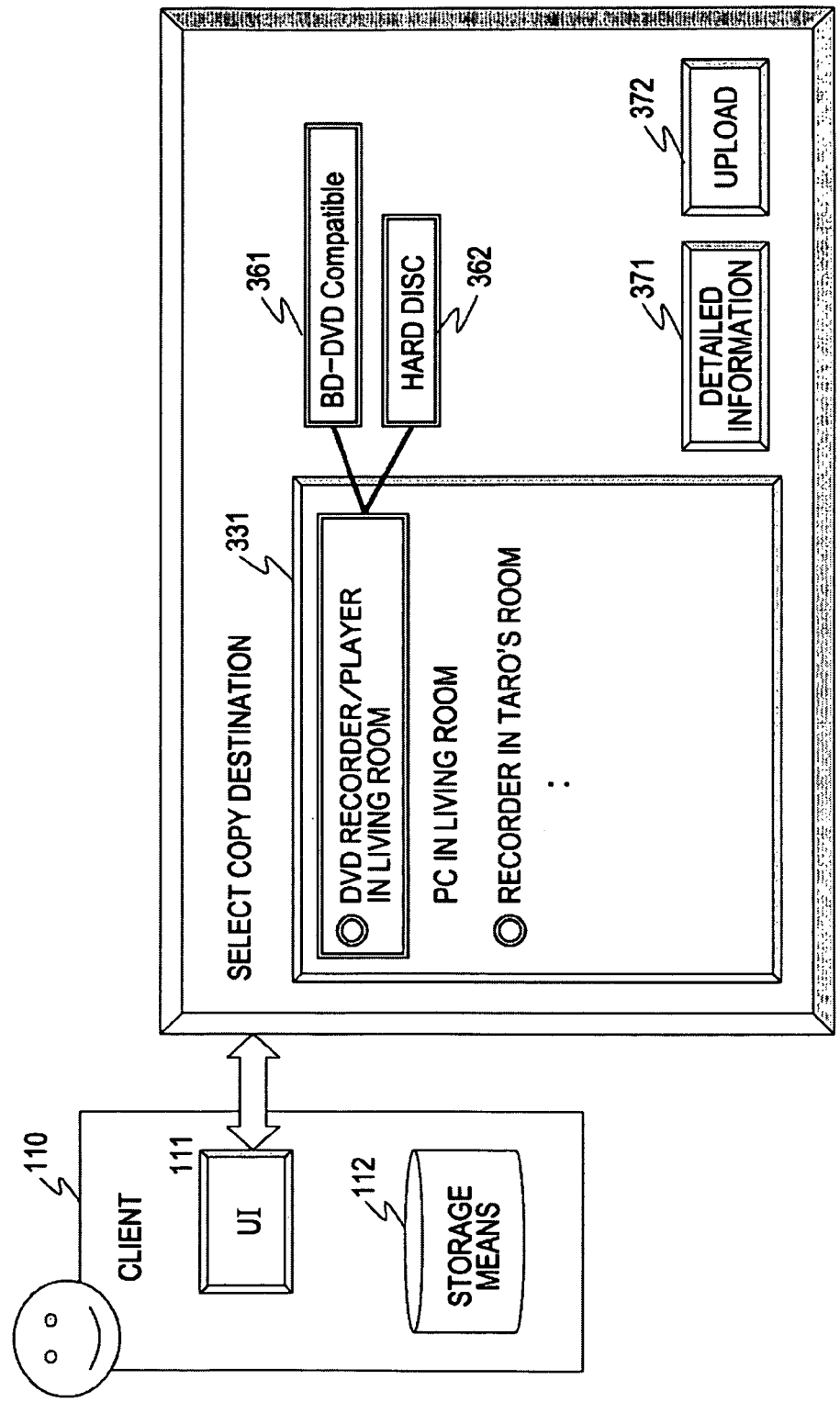
FIG. 9 is a diagram illustrating a display example of names of storage destinations displayed in the UI of the client in the process of uploading client content to the server.

The user selects a server as an upload destination of the client content from the server list 331 illustrated in FIG. 8. For example, assume that the user selects [DVD recorder/player in living room] from the server list 331, as illustrated in FIG. 9. Upon detecting input of selection by the user, the control unit of the client 110 executes a storage destination identifier obtaining action to the selected server [DVD recorder/player in living room].

The storage destination identifier obtaining action is executed as a process of obtaining information, such as an identifier corresponding to the storage means capable of storing the content included in the server, to the server specified as an upload destination in the client 110. The server that has received an inquiry from the client transmits the XML data illustrated in FIG. 10 to the client, for example.

The XML data illustrated in FIG. 10 is constituted by storage means information about the storage means capable of storing the content included in the server. Specifically, the XML data is data describing the following storage destination information [Destination Info].

```
<Desination Info>
    <Destination>
        <Name>BD-DVD Compatible</Name>
        <ID>a1</ID>
        <PossibleTypes>BD/DVD-RW/NONE</PossibleTypes>
        <CurrentType>BD</CurrentType>
        <MaxSize>48000</MaxSize>
        <CurrentSize>23513</CurrentSize>
    </Destination>
    <Destination>
        <Name>hard disc</Name>
        <ID>a2</ID>
        <PossibleTypes>HD</PossibleTypes>
        <CurrentType>HD</CurrentType>
        <MaxSize>160000</MaxSize>
        <CurrentSize>123452</CurrentSize>
    </Destination>
        :
```

<Destination> to </Destination> indicates information about one storage means. Two pieces of storage means information 381 and 382 are shown in the above-described storage destination information [Destination Info] and in FIG. 10. The data included in the storage means information 381 is described.

<Name>BD-DVD Compatible</Name> is a storage means name. This storage means name is placed beside the server list 331 and is displayed while being associated with the selected server, as illustrated in FIG. 9. In the XML data illustrated in FIG. 10, the storage means information 381 is storage means information about [BD-DVD Compatible] and the storage means information 382 is storage means information about [Hard Disc].

<ID>a1</ID> is storage means identifier (ID). In this case, it is indicated that [a1] is set as an identifier. As described above with reference to FIG. 6, the client transmits a content storage request containing this storage means identifier (ID)=a1 to the server, so that the server executes a process of storing content uploaded from the client in the storage means specified by the storage means identifier (ID).

<PossibleTypes>BD/DVD-RW/NONE</PossibleTypes> is usable medium type information of the storage means, that is, information indicating the types of medium usable in this storage means. In this case, it is indicated that a BD (Blue-Ray Disc) and a DVD-RW can be set as a recording medium. [NONE] indicates that the case where no medium is set in the storage means is possible. That is, the information indicates that this storage means is storage means to/from which a BD or DVD-RW medium can be loaded/removed.

<CurrentType>BD</CurrentType> is current medium type information of the storage means, that is, information indicating the type of medium that can be currently used in this storage means. The information indicates that the storage means is currently in the state where a BD (Blue-Ray Disc) is set and is usable. When NONE is set, which indicates that no medium is set.

<MaxSize>48000</MaxSize> is maximum capacity information of the medium, that is, information indicating the total capacity of the medium currently usable in this storage means.

<CurrentSize>23513</CurrentSize> is currently available capacity information of the medium, that is, information indicating a remaining available capacity of the medium currently usable in this storage means.

The server transmits the XML data describing those pieces of storage means information about the respective storage means included in the server to the client. On the basis of those pieces of storage means information received from the server, the client displays pieces of storage means name information 361 and 362 held in the selected server, as illustrated in FIG. 9. Those storage means names are information obtained from <Name>BD-DVD Compatible</Name> recorded in the storage means information 381 and <Name>Hard Disc</Name> recorded in the storage means information 382 in the XML data illustrated in FIG. 10.

Display of those pieces of storage means name information 361 and 362 allows the user on the client 110 side to know that the server [DVD recorder/player in living room] displayed in the server list 331 and selected includes [BD-DVD Compatible] and [Hard Disc] as storage means and that these storage means can be selected as a content storage destination.

Incidentally, the information to be displayed in the UI 111 in the client 110 can be variously set by an application executed on the client side. In the example illustrated in FIG. 9, the storage means names [Name] recorded in the pieces of storage means information 381 and 382 illustrated in FIG. 10 are selected and displayed. For example, setting can be made to display the current medium type information [CurrentType] recorded in the pieces of storage means information 381 and 382.

Figure 11:
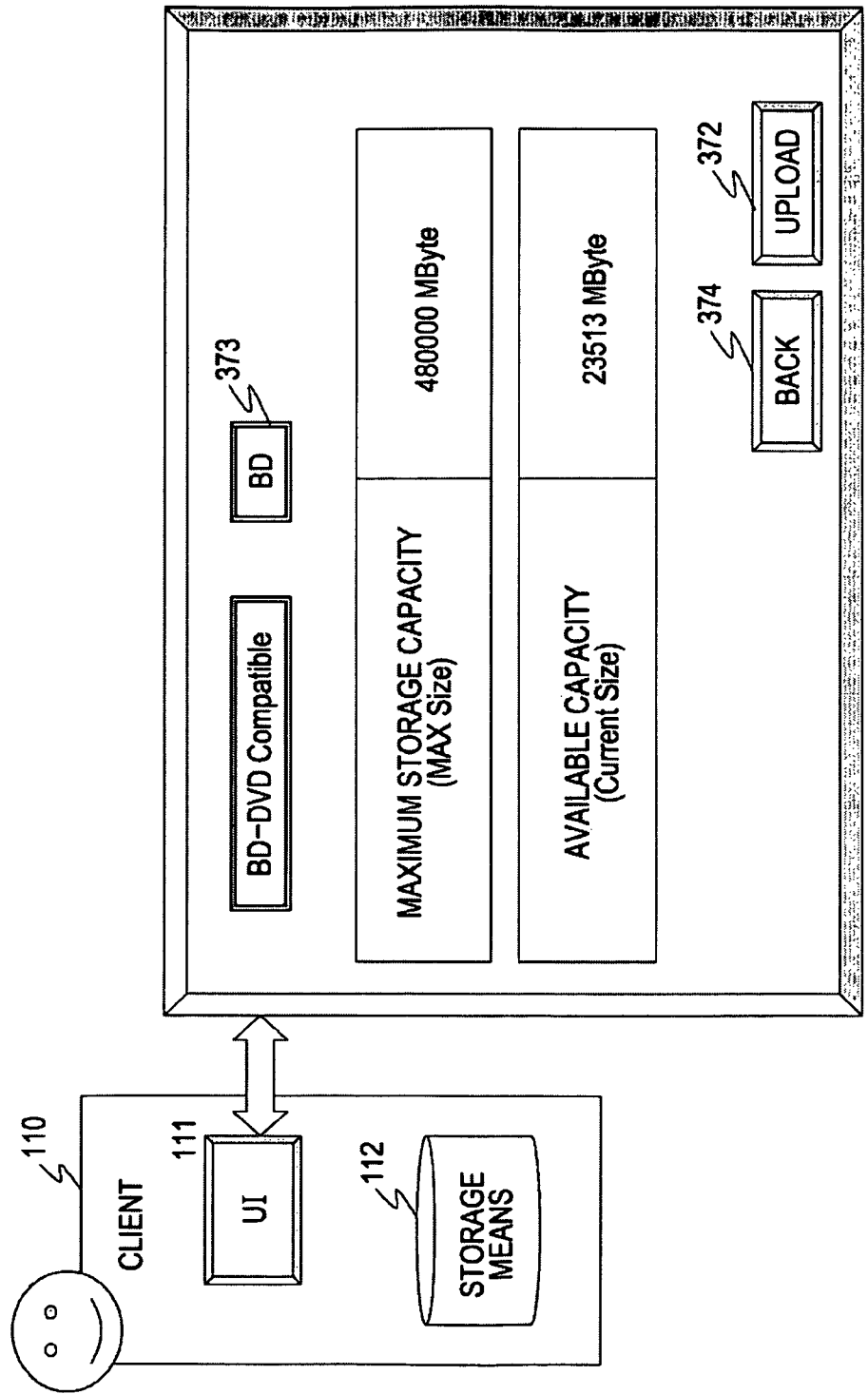
FIG. 11 is a diagram illustrating a display example of storage means information displayed in the UI of the client in the process of uploading client content to the server.

Furthermore, for example, setting can be made to display detailed information corresponding to [BD-DVD Compatible] illustrated in FIG. 11 when the user selects the storage means name information [BD-DVD Compatible] 361 illustrated in FIG. 9 and selects a detailed information icon 371. The display data illustrated in FIG. 11 is a display data example including current medium type information [CurrentType] 373, maximum capacity information of the medium [MaxSize], and currently available capacity information of the medium [CurrentSize] as display information. When a [Back] icon 374 illustrated in FIG. 11 is operated, the screen goes back to the UI display data screen illustrated in FIG. 9.

After selecting the server as an upload destination and the storage destination, the user operates an upload icon 372 that is set in the UI display data illustrated in FIG. 9 or in the UI display data illustrated in FIG. 11. When the control unit of the client detects the operation information, an upload process with specification of the storage destination to the selected server is started. That is, as described above with reference to FIG. 6, a process of transmitting the content storage destination identifier 302 as content storage destination specifying information in addition to the container non-specified information [Any Container] 301 illustrated in FIG. 6 and a process of transmitting content uploaded from the client to the server are sequentially executed in accordance with a preset process sequence.

Figure 12:
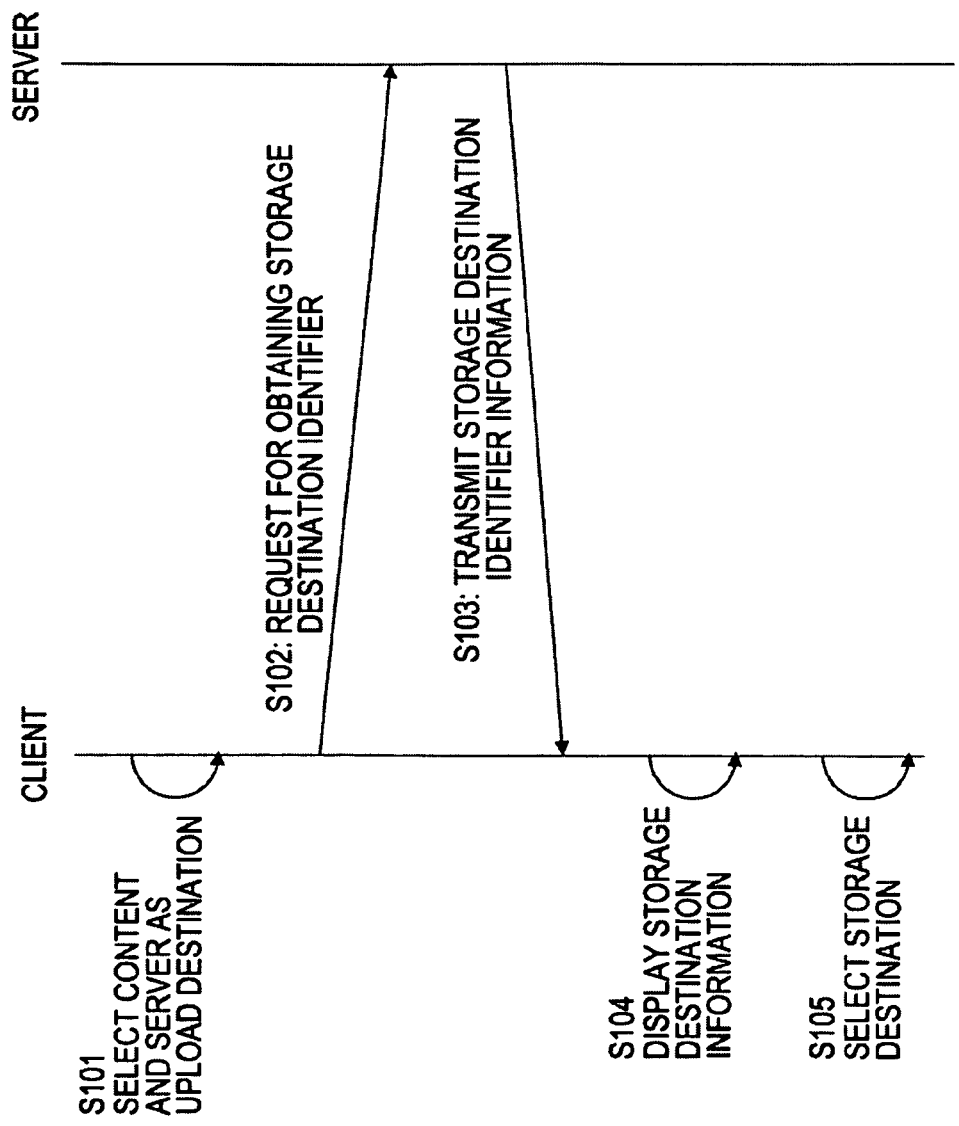
FIG. 12 is a diagram illustrating a process sequence of the client and the server in the process of uploading client content to the server.

Details of the above-described content upload process sequence with specification of a storage destination are described with reference to FIGS. 12 and 13. First, in step S101 in FIG. 12, the client selects content to be uploaded and a server as an upload destination. First, the content selecting process is a process executed by displaying the content selecting screen described above with reference to FIG. 7 in the UI.

As illustrated in FIG. 7, when the user selects specific content, selecting icons of [Reproduce] for a content reproducing process or [Copy] for a content upload process are displayed. When the user selects the [Copy] icon, the server list illustrated in FIG. 8 is displayed in the UI. As described above, the server list is a list created on the basis of device information (Device Description) from the devices.

When the user selects a server as a content upload destination from the server list, the control unit of the client executes a storage destination identifier obtaining action. In step S102, the client executes a request for obtaining information, such as an identifier corresponding to the storage means in which the content can be stored included in the server, to the server specified as an upload destination.

The server that has received the request from the client transmits XML data including the storage destination information described above with reference to FIG. 10 to the client in step S103. That is, XML data including information about the storage means in which the content can be stored included in the server. The XML data includes a storage means identifier (ID), which is an ID corresponding to storage means.

In step S104, the client that has received the XML data including the storage destination information from the server displays the storage means information of the selected server in the UI of the client on the basis of the received information. For example, the client displays the pieces of storage means name information 361 and 362 held by the selected server, as illustrated in FIG. 9. Furthermore, the current medium type information [CurrentType] 373, the maximum capacity information of the medium [MaxSize], and the currently available capacity information of the medium [CurrentSize] may be presented, as illustrated in FIG. 11.

In step S105, the client selects a storage destination. For example, the client selects a storage destination by operating the upload icon in the data displayed in the UI illustrated in FIGS. 9 and 11. Incidentally, the description is given here about an example where the user executes a process of selecting a storage destination, but a configuration of automatically selecting a storage destination on the basis of the information preset in the client device without interaction with the user may be adopted.

For example, a specific storage destination of a specific server is set and registered as a default content upload destination (content storage destination) as setting information of the client. The registered information is recorded in nonvolatile storage means of the client. The control unit reads the registered information at execution of the content upload process, decides the server and the storage destination, and executes the process. By using such registered information, the user only needs to select content, whereby the registered server selection information and storage destination selection information are read and the process is automatically executed.

Figure 13:
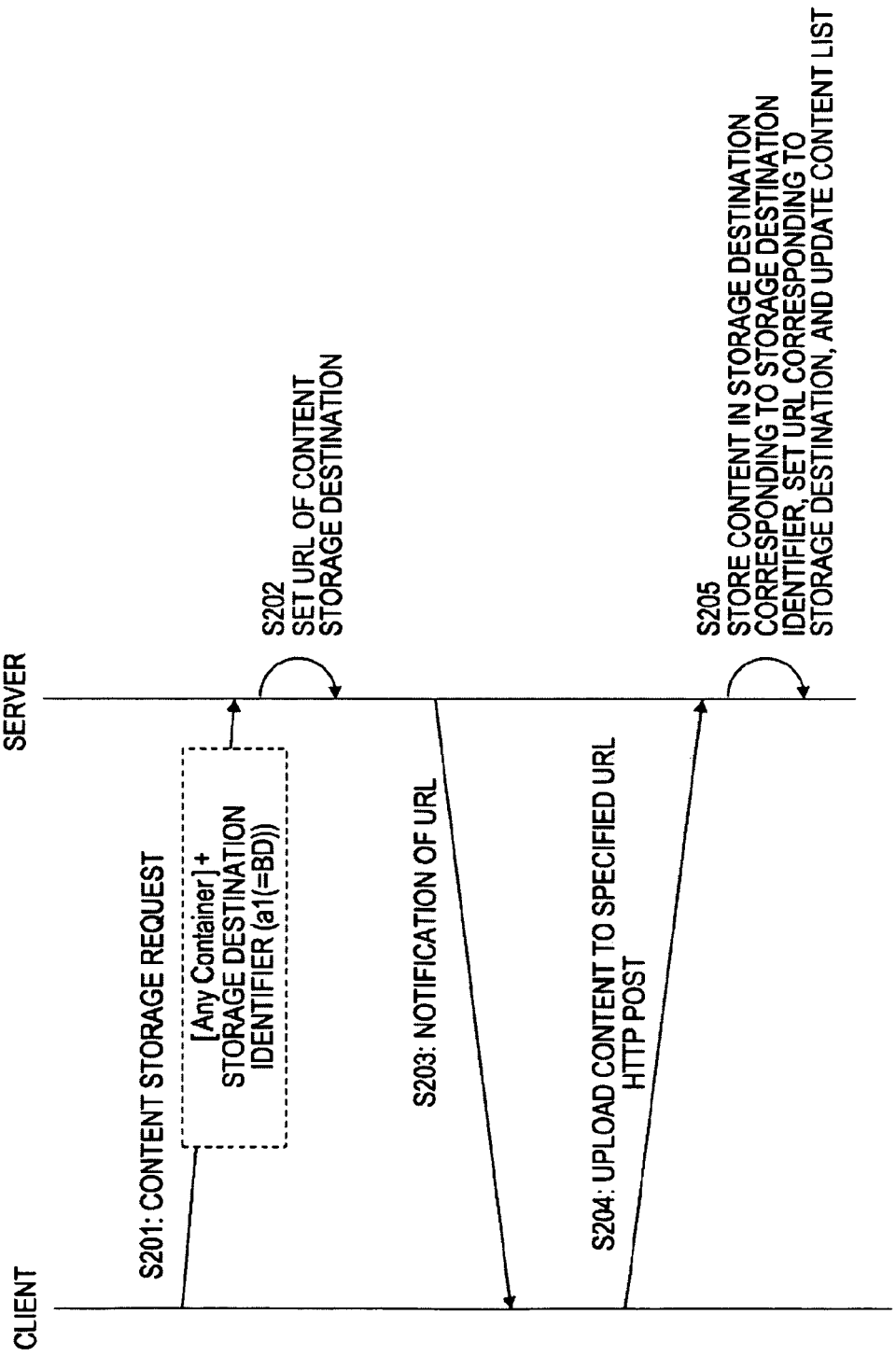
FIG. 13 is a diagram illustrating a process sequence of the client and the server in the process of uploading client content to the server.

Next, the sequence diagram illustrated in FIG. 13 is described. After the upload storage destination is decided in step S105 in FIG. 12, the control unit of the client transmits a content storage request to the selected server in step S201 in FIG. 13. That is, as described above with reference to FIG. 6, the control unit executes a process of transmitting the content storage destination identifier 302 as content storage destination specifying information to the server in addition to the container non-specified information [Any Container] 301 illustrated in FIG. 6. For example, the control unit transmits an identifier [a1] corresponding to the BD to the server.

The server receives the content storage request from the client, sets a temporary URL as a content upload destination in step S202, and notifies the client of the set URL for upload in step S203.

After receiving the notification about the URL for upload, the client executes upload of the content by specifying the URL in step S204. The upload process is executed as a process applying an HTTP POST command, for example.

In step S205, the server that has received the content uploaded from the client selects the storage means corresponding to the storage destination identifier (e.g., [a1]) received from the client in step S201 as a storage destination of the uploaded content, executes recording of the uploaded content, furthermore, sets a formal URL of the uploaded content, executes the content list updating process of associating the uploaded content with the content list described above with reference to FIG. 3, and ends the process.

As described above, according to the process configuration of the present invention, the client can execute a content storing process by specifying storage means in the server.

Incidentally, the above-described process example shows an example of displaying all the servers to which content can be uploaded in the server list displayed in the UI of the client described above with reference to FIG. 8. Alternatively, the following configuration can be used. That is, setting information allowing only a specific medium (e.g., BD) as an upload destination of the client content is registered in the storage means of the client, and the control unit of the client executes control of referring to the registered information, selecting only the server in which the BD can be used, and displaying the selected server as an entry of the server list in a process of displaying the server list.

Also, in the configuration according to the above-described embodiment, a storage destination identifier action is executed only to the server selected by the client and storage means information is received only from the selected server. Alternatively, the storage destination identifier action may be executed to all or plural servers connected to the network, storage means information may be received from the plural servers, and the storage means information may be displayed in the UI of the client. Alternatively, registered information in which a specific medium (BD or the like) is set as a storage medium for uploaded content may be applied as described above, only servers in which the BD can be used may be selected, the storage destination identifier action may be executed only to those selected servers, storage means information as a storage destination may be received only from the selected servers, and the storage means information may be displayed in the UI.

Also, there are many variations in the process of displaying information based on the storage means information according to the XML data received from the server. For example, in the case where NONE is set to the current medium type information [CurrentType] of the storage means included in the storage means information obtained from the server and where the control unit of the client detects that no medium is set, a process of executing display of a warning in the UI of the client may be performed.

Furthermore, for example, in the case where the amount of content selected by the user to be uploaded is compared with the currently available capacity information [CurrentSize] of the medium included in the storage means information obtained from the server and where the capacity indicated by the currently available capacity information [CurrentSize] of the medium is equal to or smaller than the amount of content to be uploaded, a process of executing display of a warning may be performed.

[Specific Examples of Configuration and Process Applying the Present Invention]

Next, specific examples of the configuration and process applying the present invention are described with reference to FIGS. 14 to 16. First, specific examples of a programmed recording process are described with reference to FIGS. 14 and 15.

The programmed recording process is a process of programming recording of a program that is to be broadcasted by a broadcast station in the future. A user displays an electronic program guide (EPG) or the like in a display device and selects a program on which programmed recording is to be executed. Alternatively, the user may perform programmed recording by selecting date, tithe, and channel without using the EPG.

In addition, this programmed recording function can be started by any of a receiver having a function of receiving broadcasts from broadcast stations and a recorder having a function of executing a recording process on a recording medium such as a DVD. The process sequences in the case where programmed recording is executed in a recorder and in the case where programmed recording is executed in a receiver are as follows.

(a) The Case where Programmed Recording is Executed in Recorder

Figure 14:
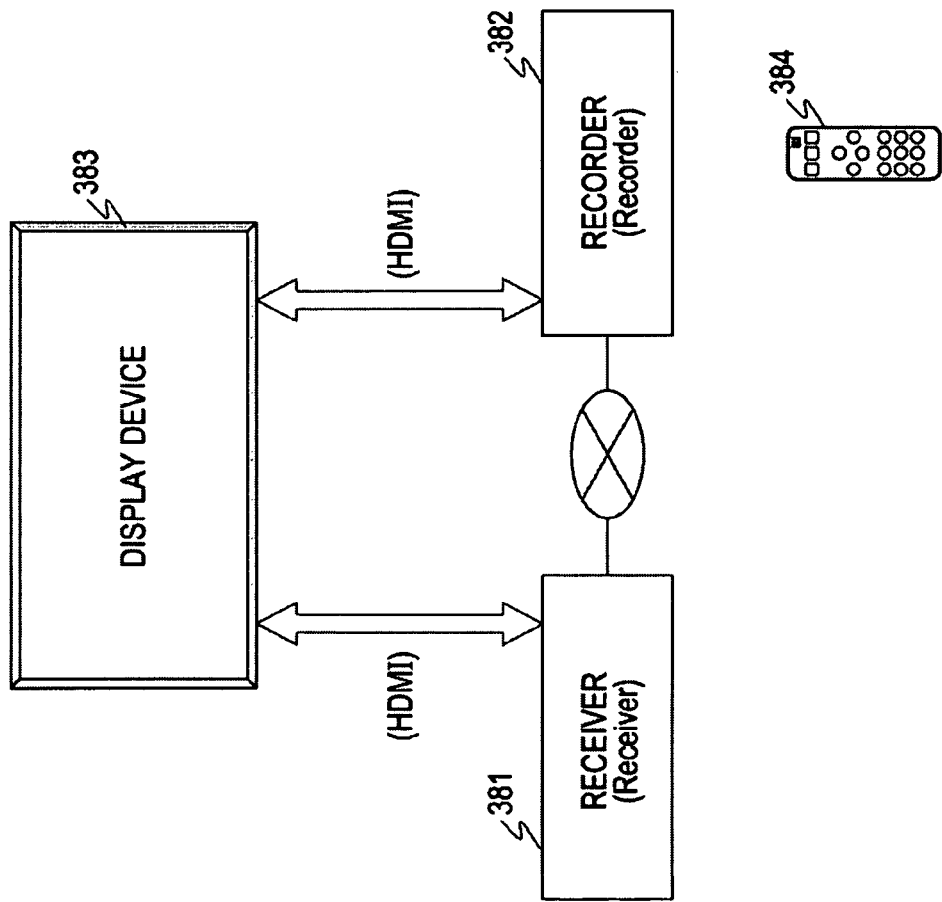
FIG. 14 is a diagram illustrating an example of a content recording process executed in a receiver and a recorder.

With reference to FIG. 14, a description is given about a sequence of a programmed recording process and a recording process in the case where programmed recording is executed in a recorder. FIG. 14 illustrates a receiver 381, a recorder 382, a display device 383, and a remote control 384 compatible with the recorder 382. Incidentally, in the correspondence between each of the receiver 381 and the recorder 382 illustrated in FIG. 14 and the server-client configuration illustrated in FIG. 1, the receiver 381 corresponds to the client and the recorder 382 corresponds to the server.

The receiver 381 and the recorder 382 are connected via a network. Furthermore, each of the receiver 381 and the recorder 382 is connected to the display device 383 via an HDMI (High Definition Multimedia Interface) that is used as an interface standard for inputting/outputting digital images and voices, for example.

The HDMI is an interface standard designed for inputting/outputting digital images and voices mainly for home appliances and AV devices, and is further development of a DVI (Digital Visual Interface) of a digital interface used to connect a personal computer to a display. In the HDMI, a video signal, an audio signal, and a control signal can be transmitted/received together by using a cable. A transmitter-side device to execute transmission of content in accordance with the HDMI standard is called an HDMI source, and a content receiver-side device is called an HDMI sink.

In this setting, both of the receiver 381 and the recorder 382 are set as a source with respect to the display device 383, whereas the display device 383 is set as a sink.

In this setting, the recorder 382 is a server having a CDS (Content Directory Service) function. The receiver 381 serving as a client can detect the recorder 382 by using the server list 331 described above with reference to FIG. 8.

The sequence of the programmed recording process and the recording process to perform programmed recording in the recorder is as follows.

(Step a1)
A user selects a program to be recorded by using the EPG or another method in the recorder 382 by operating the remote control 384, for example.

(Step a2)
On the side of the recorder 382, the user creates programmed recording information in the receiver 381 and stores the information in a storage unit of the receiver 381 by operating the remote control 384, for example.

(Step a3)
The recorder 382 creates programmed recording information therein on the basis of user specified information and stores the information in a storage unit of the recorder 382.

(Step a4)
The receiver 381 starts receiving the program in accordance with programmed information at recording starting time (event) recorded in the programmed recording information and transmits received content to the recorder 382.

(Step a5)
The receiver 381 continues transmission of the content to the recorder 382 until recording ending time (event) recorded in the programmed recording information.

On the other hand, the sequence of the programmed recording process and the recording process in the case where programmed recording is executed in the recorder is executed in the above-described procedure a1 to a5. A control unit of the recorder executes processes of starting and stopping input of content from the receiver in accordance with information about recording starting time and expected ending time of the broadcasted content to be recorded registered in advance.

(b) The Case where Programmed Recording is Executed in Receiver

Figure 15:
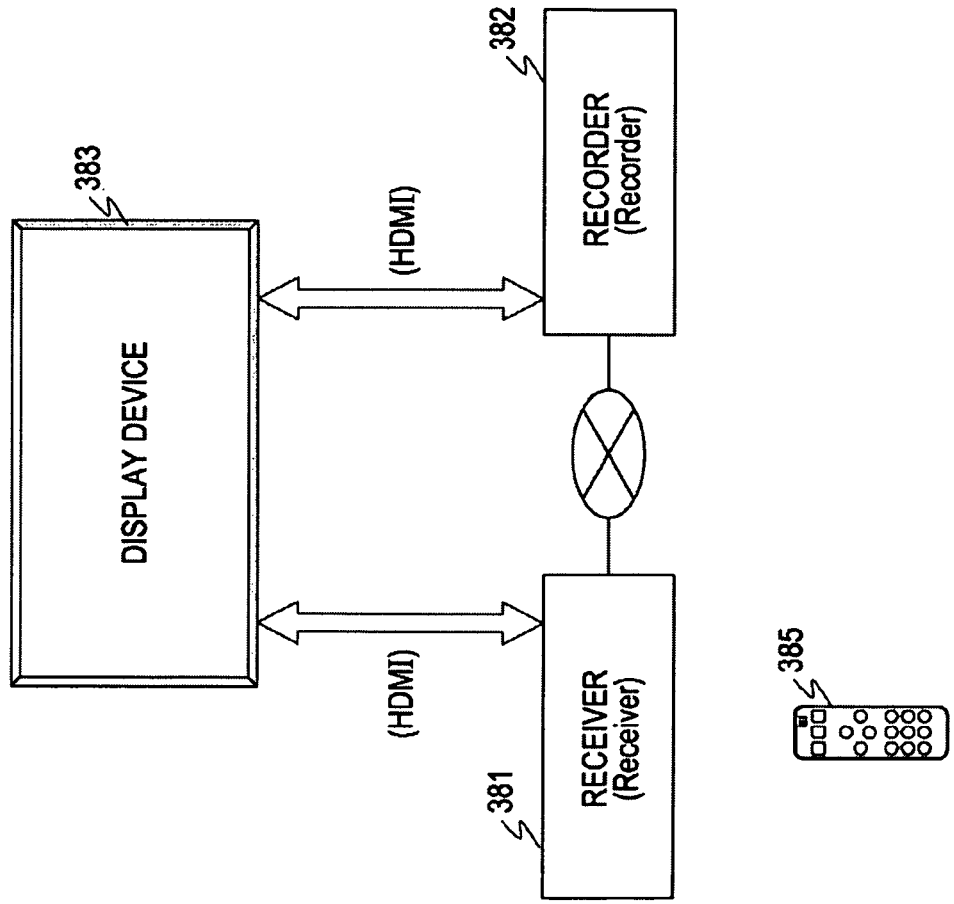
FIG. 15 is a diagram illustrating an example of the content recording process executed in the receiver and the recorder.

With reference to FIG. 15, a description is given about a sequence of a programmed recording process and a recording process in the case where programmed recording is executed in the receiver. As FIG. 14, FIG. 15 illustrates the receiver 381, the recorder 382, the display device 383, and a remote control 385 compatible with the receiver 381.

The sequence of the programmed recording process and the recording process to perform programmed recording in the receiver is as follows.

(Step b1)
A user selects a program to be recorded by using the EPG or another method in the receiver 381 by operating the remote control 385, for example.

(Step b2)
The receiver 381 creates programmed recording information on the basis of user specified information and stores it in the storage unit of the recorder 382.

(Step b3)
On the side of the receiver 381, programmed recording information is created in the receiver 381 on the basis of the user specified information and the information is stored in the storage unit of the receiver 381.

(Step b4)
The receiver 381 starts receiving the program in accordance with programmed information at recording starting time (event) recorded in the programmed recording information and transmits received content to the recorder 382.

(Step b5)
The receiver 381 continues transmission of the content to the recorder 382 until recording ending time (event) recorded in the programmed recording information.

The sequence of the programmed recording process and the recording process in the case where programmed recording is executed in the receiver is executed in the above-described procedure b1 to b5.

In this way, the control unit of the receiver that executes a process of receiving broadcasted content and outputting the received content to the server as a recorder executes processes of starting and stopping output of the received content to the recorder in accordance with information about recording starting time and expected ending time of the broadcasted content to be recorded registered in advance.

Figure 16:
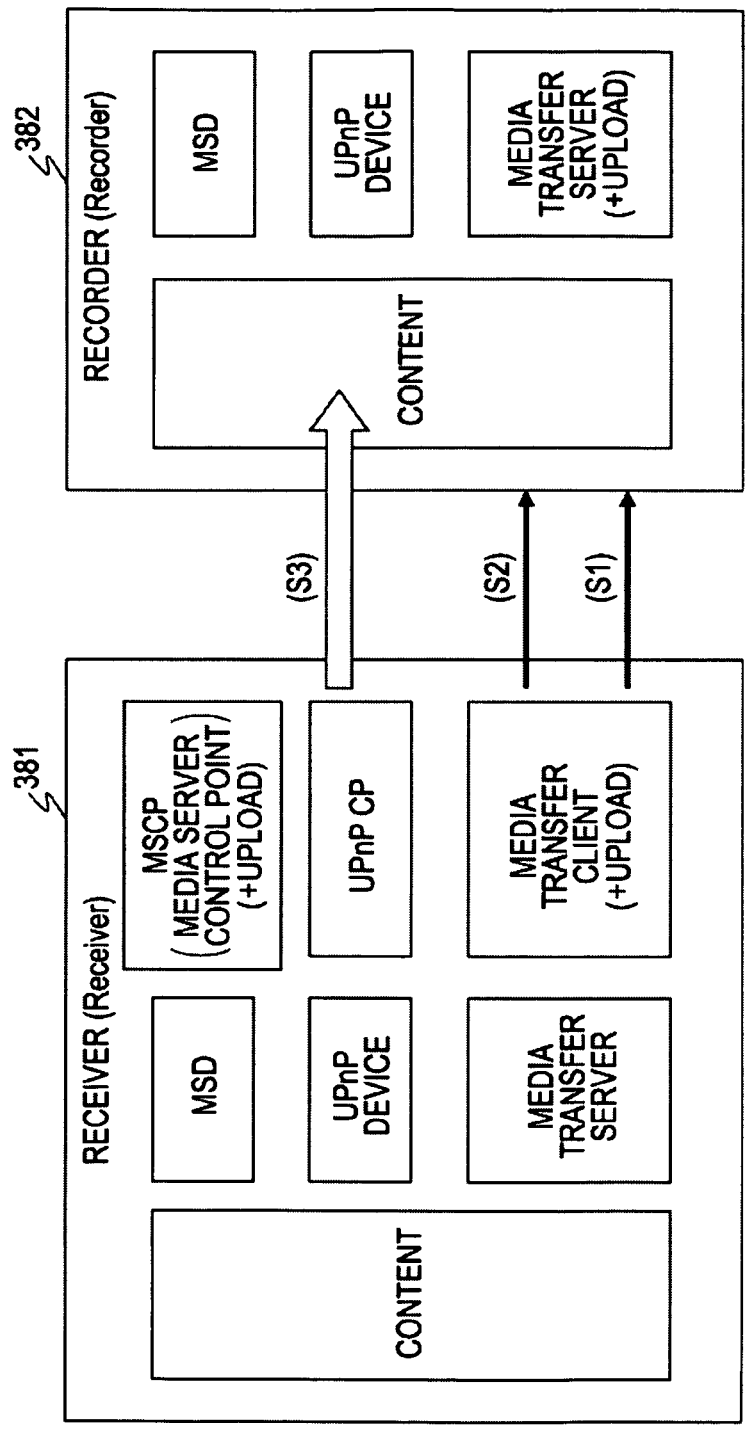
FIG. 16 is a diagram illustrating an example of the content recording process executed in the receiver and the recorder.

Next, a description is given about a process sequence of outputting content received by the receiver 381 in the above-described recording process or held in the storage unit in the receiver 381 to the recorder 382 and recording the content on a recording medium in the recorder 382, such as a DVD or an HD, with reference to FIG. 16.

As illustrated in the figure, the receiver 381 has the following functions: a media server control point (MSCP); a UPnP control point (UPnP CP); a media transfer client; a UPnP device; a media server device (MSD); and a media transfer server. By using these functions, the receiver 381 executes a process of receiving content from a broadcast station or the like and recording the content in an internal storage unit and a process of outputting the content to the recorder 382.

On the other hand, the recorder 382 has the following functions: a media server device (MSD); a UPnP device; and a media transfer server. By using these functions, the recorder 382 executes a process of receiving content from the receiver 381 and recording the content in an internal storage unit.

In the case where the receiver 381 outputs content to the recorder 382 for execution of a recording process, the following steps are sequentially executed between the receiver 381 and the recorder 382, for example.

(Step S1)

A UPnP action is started to select a medium (e.g., HDD, DVD, or BD) on which a recording process is to be executed.

(Step S2)

A UPnP action is started to create an entry of the CDS (Content Directory Service) for recorded content.

(Step S3)

Content is output from the receiver 381 to the recorder 382, and the recorder 382 executes a recording process by associating the content with the entry set in the CDS.

In the case where the receiver 381 outputs content to the recorder 382 for execution of a recording process, determination of a recording destination and a process of uploading the content to be recorded (transfer of the content from the receiver to the recorder) are executed in the above-described manner. Hereinafter, a specific process example is described. A process sequence of determining a recording destination and uploading content to be recorded is executed in the following procedure of steps SP1 to SP6, for example.

(Step SP1)

First, the receiver lists possible recording destinations that are available from the recorder.

The receiver outputs the following XML data as a list request command to the recorder.

List request command: X_HDLnkGetRecordDestinations( )

The recorder that has received this request command provides the receiver with recordable media information as a response. For example, the recorder provides the following response.

Response:

```
X_HDLnkGetRecordDestinations("
<?xml version="1.0" encoding="UTF-8"?>
<RecordDestinations
xmlns="urn:schemas-hdlnk-org">
<RecordDestination destID="bd1" version="1">
Summer 2006 Vacation (BD)
</RecordDestination>
<RecordDestination destID="hdd1" version="1">
```

-continued

```
Local HDD video collection
</RecordDestination>
<RecordDestination destID="hdd2" version="1">
Temporary storage space
</RecordDestination>
</RecordDestinations>")
```

The above-described XML data is data indicating a simple storage means list obtained before the storage means information described above with reference to FIG. 10, and <RecordDestination destID= . . . > to </RecordDestinations> indicates information about single storage means. Each of bd1, hdd1, and hdd2 is identification information of storage means, and bd1 indicates a first BD (Blue-ray disc), hdd1 indicates a first HDD (hard disc), and hdd2 indicates a second HDD (hard disc).

(Step SP2)

After receiving the above-described storage means information from the recorder, the receiver presents a list of storage means, that is, recording destinations, to the user by using nicknames (friendly names) preset for the respective storage means (bd1, hdd1, and hdd2), e.g., [BD in Taro's room]. The user selects a recording destination from the presented list, e.g., selects "bd1" [BD (Blue-Ray Disc)]

(Step SP3)

The receiver outputs [inquiry about status of recording destination] to inquire about the status of the selected recording destination to the recorder. For example, inquiry about status of recording destination: X_HDLnkGetRecordDestinationInfo("bd1"). The above-described XML data is an information obtaining request of [bd1: first BD (Blue-Ray Disc)].

The recorder that has received this request command provides media information as a response to the receiver. For example, the recorder provides the following response.

Response:

```
X_HDLnkGetRecordDestinationInfo("
<?xml version="1.0" encoding="UTF-8"?>
<RecordDestinationInfo
xmlns="urn:schemas-hdlnk-org" version="1"
allowedTypes="BD,DVD+RW,DVD-R,NONE"recordable="1"
totalCapacity="26843545600" <!--25GB-->
availableCapacity="10485760"> <!--10MB-->
BD
</RecordDestinationInfo>")
```

This XML data corresponds to the storage means information described above with reference to FIG. 10. However, in the above-described example, a response to the information obtaining request of [bd1: first BD (Blue-Ray Disc)], which is storage means information of only [bd1: first BD (Blue-Ray Disc)], is provided from the recorder to the receiver.

"allowedTypes" is information of the types of medium usable in the recorder, that is, information indicating the types of medium usable in this storage means. In this case, the information indicates that a BD (Blue-Ray Disc), a DVD+RW, and a DVD-R can be set as a recording medium. [NONE] indicates that the case where no medium is set in the storage means is possible. That is, the information indicates that this storage means is storage means to/from which a medium such as a BD can be loaded/removed.

"totalCapacity" is maximum capacity information of the medium, that is, information indicating the total capacity of the medium currently usable in this storage means.

<CurrentType>BD</CurrentType> is current medium type information of the storage means, that is, information indicating the type of medium currently usable in this storage means. The information indicates that a BD (Blue-Ray Disc) is currently set in the storage means and is usable. When NONE is set, which means no medium is set.

<MaxSize>48000</MaxSize> is maximum capacity information of the medium, that is, information indicating the total capacity of the medium currently usable in this storage means.

"availableCapacity" is currently available capacity information of the medium, that is, information indicating a remaining available capacity of the medium currently usable in this storage means. In this example, it is notified that 10485760≈10 MB of data can be stored.

(Step SP4)

The receiver analyzes the above-described media information received from the recorder in step SP3, creates data to be displayed described above with reference to FIG. 11 on the basis of the information, and displays the data in the display unit. Furthermore, the receiver outputs a message to the user, the message indicating that the disc in the recorder can be replaced by a blank disc.

As described above with reference to the sequence diagram in FIG. 13, the amount of content to be uploaded selected by the user is compared with the available capacity information of the medium included in the storage means information obtained from the server. If the available capacity of the medium is equal to or smaller than the amount of content to be uploaded, a warning is displayed.

The control unit of the receiver that executes a process of receiving broadcasted content and outputting the received content to the server as a recorder obtains the amount of broadcasted content to be recorded from the content attribute information included in EPG data or the like, and compares the obtained amount of content with the available capacity of the storage means included in the storage means information received from the recorder. If the available capacity of the storage means is equal to or smaller than the amount of content to be stored, the control unit displays a warning in the display unit.

If the user determines that 10 MB is insufficient for recording the video content on the basis of the displayed warning, the user replaces the medium in the recorder by a blank disc (BD). Then, the receiver restarts the operation of (step SP1). With this process, the medium (BD) of 10 MB or more can be used.

(Step SP5)

After determining that the medium having a sufficient storage capacity can be used, the receiver inquires about a container ID for an operation of uploading the content.

Inquiry About Container ID:

```
X_HDLnkGetRecordContainerID("bd1",”
<?xml version="1.0"encoding="UTF-8"?>
<DIDL-Lite
xmlns:dc="http://purl.org/dc/elements/1.1/"
xmlns="urn:schemas-upnp-org:metadata-1-0/DIDL-Lite/"
xmlns:upnp="urn:schemas-upnp-org:metadata-1-0/upnp/"
xmlns:xsi="http://www.w3.org/2001/XMLSchema-instance"
xsi:schemaLocation="
urn:schemas-upnp-org:metadata-1-0/DIDL-Lite/
http://www.upnp.org/schemas/av/didl-lite-v2-20060531.xsd
urn:schemas-upnp-org:metadata-1-0/upnp/
http://www.upnp.org/schemas/av/upnp-v2-20060531.xsd">
<item id="" parentID="" restricted="0">
<dc:title>Friends ? Episode 3</dc:title>
<upnp:class>
```

-continued

```
object.item.movie.videoItem
</upnp:class>
</item>
</DIDL-Lite>")
```

The above-described XML data is data describing a request for obtaining an identifier of a usable container (container ID) of [bd1: first BD (Blue-Ray Disc)].

As a response to the inquiry about the container ID for the upload operation from the receiver, the recorder provides the following response to the receiver, for example.

Response:

X_HDLnkGetRecordContainerID("video:bdrec")

The above data is data indicating that the container ID=video:bdrec.

(Step SP6)

The receiver receives the container ID=video:bdrec as an identifier of the container to store the content, and uploads the content as content to be stored in this container by using a DLNA upload operation.

Content Upload Request:

```
CreateObject("video:bdrec", "
<?xml version="1.0" encoding="UTF-8"?>
<DIDL-Lite
xmlns:dc="http://purl.org/dc/elements/1.1/"
xmlns="urn:schemas-upnp-org:metadata-1-0/DIDL-Lite/"
xmlns:upnp="urn:schemas-upnp-org:metadata-1-0/upnp/"
xmlns:xsi="http://www.w3.org/2001/XMLSchema-instance"
xsi:schemaLocation="
urn:schemas-upnp-org:metadata-1-0/DIDL-Lite/
http://www.upnp.org/schemas/av/didl-lite-v2-20060531.xsd
urn:schemas-upnp-org:metadata-1-0/upnp/
http://www.upnp.org/schemas/av/upnp-v2-20060531.xsd">
<item id="" parentID="video:bdrec" restricted="0">
<dc:title>Friends ? Episode 3</dc:title>
<upnp:class>
object.item.movie.videoItem
</upnp:class>
</item>
</DIDL-Lite>")
```

The above-described request is a request for creating a container having the container ID=video:bdrec and storing the uploaded content in the created container.

The recorder provides the receiver with the following response as a response to the content upload request from the receiver, for example.

Response:

```
CreateObject("video:bdrec:031", "
<?xml version="1.0" encoding="UTF-8"?>
<DIDL-Lite
xmlns:dc="http://purl.org/dc/elements/1.1/"
xmlns="urn:schemas-upnp-org:metadata-1-0/DIDL-Lite/"
xmlns:upnp="urn:schemas-upnp-org:metadata-1-0/upnp/"
xmlns:xsi="http://www.w3.org/2001/XMLSchema-instance"
xsi:schemaLocation="
urn:schemas-upnp-org:metadata-1-0/DIDL-Lite/
http://www.upnp.org/schemas/av/didl-lite-v2-20060531
urn:schemas-upnp-org:metadata-1-0/upnp/
http://www.upnp.org/schemas/av/upnp-v2-20060531.xsd">
<item id="video:bdrec:031" parentID="video:bdrec"
restricted="0">
<dc:title> Friends ? Episode 3</dc:title>
<dc:creator></dc:creator>
<res importUri="http://bdrec/record?id=031"
protocolInfo="*:*:video:*">
</res>
```

-continued

```
<upnp:class>
object.item.movie.videoItem
</upnp:class>
<upnp:genre></upnp:genre>
<upnp:album>My favorite episodes</upnp:album>
</item>
</DIDL-Lite>")
```

The above-described response is a notification indicating that creation of the container having the container ID=video: bdrec has been accepted and that setting has been made so that the uploaded content can be stored in the created container. After this response, the receiver executes a content upload process by specifying the container.

[Functional Configuration of Information Processing Devices Constituting Server and Client]

Next, an example of a configuration of information processing devices as a client and a server executing the above-described processes is described with reference to FIG. 17. The server and the client can be realized by various information devices and have a configuration unique to respective functions. FIG. 17 is a block diagram illustrating a basic function as a server and a client. Incidentally, a specific example of a hardware configuration is described below with reference to FIG. 18.

FIG. 17 illustrates a basic configuration of a client 410 and a server 420. The client 410 includes a control unit 411, a storage unit 412, a communication unit 413, a display unit 414, and an input unit 415. The display unit 414 and the input unit 415 correspond to the UI 111 of the client 110 described above with reference to FIG. 6 and so on. The server 420 includes a control unit 421, storage units 422a and 422b, and a communication unit 423.

The storage unit 412 of the client 410 stores content and a program to be executed in the control unit 411. The control unit 411 executes the above-described various processes on the basis of the program stored in the storage unit 412. Likewise, the storage unit 422a or the storage unit 422b of the server 420 stores content and a program to be executed in the control unit 421. The control unit 421 executes the above-described various processes on the basis of the program stored in the storage unit 422.

As described above, the client 410 is an information processing device to execute a content storing process to the server 420 via a network and executes data communication via the network in the communication unit 413. The control unit 411 executes the above-described various processes on the basis of the program stored in the storage unit 412. Specifically, the control unit 411 executes a process of accepting, from the server 420, storage means information including storage destination identifiers which are identifiers corresponding to the storage units 422a, 4222b . . . included in the server 420, and transmitting a content storage request including a storage destination identifier and the content to be stored to the server 420.

Also, the control unit 411 of the client 410 executes a process of creating a content storage request including the storage destination identifier corresponding to the specified storage means of the server 420 on the basis of input of content storage destination specifying information via the input unit 415 and transmitting the content storage request to the server 420. Alternatively, the control unit 411 executes a process of obtaining content storage destination specifying information recorded as registered information in the storage unit 412, creating a content storage request including the storage destination identifier corresponding to the obtained registered information, and transmitting the content storage request to the server 420.

As described above with reference to FIG. 6, the control unit 411 of the client 410 executes a process of transmitting, to the server, information to allow the server to associate the content to be transmitted to the server 420 with the container in the management directory of the CDS of the server 420, that is, in the content list illustrated in FIG. 3. On the basis of the information, the server 420 executes a process of associating the content with the content on the basis of a determination on the server side.

Furthermore, the control unit 411 of the client 410 executes a process of creating display information including storage means information on the basis of the storage means information received from the server 420 and displaying the display information in the display unit 414. For example, as described above with reference to FIG. 9, the control unit 411 creates display information including the storage means names included in the storage means information and displays the display information in the display unit 414. Furthermore, the control unit 411 executes display of a warning to the display unit 414 on the basis of no-medium-set state information to the storage means included in the storage means information received from the server 420. Also, the control unit 411 executes a process of comparing the available capacity of the storage means included in the storage means information received from the server 420 with the amount of content to be stored. If the available capacity of the storage means of the server is equal to or smaller than the amount of content to be stored, the control unit 411 executes display of a warning to the display unit 414. Also, the control unit 411 executes control of various processes accompanied with the above-described upload of content.

On the other hand, the server 420 is an information processing device to execute a process in response to a content storage request from the client 410 via the network. The communication unit 423 executes data communication with the client 410 via the network. The control unit 421 executes a content storing process by receiving the content storage request including the storage destination identifier as the identifier corresponding to the storage means (storage units 422a, b, . . . ) included in the server 420 from the client 410 via the communication unit 423 and by selecting the storage means corresponding to the received storage destination identifier as a storage destination of the content transmitted from the client.

Also, the control unit 421 of the server 420 executes a process of transmitting, to the client 410, storage means information including the storage destination identifiers as identifiers corresponding to the storage means (storage units 422a, b, . . . ) held in the server 420, in accordance with receipt of a storage means information obtaining request from the client 410. Specifically, as described above with reference to FIG. 10, the control unit 421 executes a process of transmitting, to the client 410, information about media that can be set in the storage means included in the server 420, storage means information including information about a current medium that is set in the storage means, and storage means information including information about the capacity of the medium.

Also, the control unit 421 of the server 420 executes a process of associating the content received from the client 410 with the content managing directory in accordance with the CDS (Content Directory Service) function to perform content management by the content management directory having a hierarchical structure. This content managing directory is the content list described above with reference to FIG. 3, has a tree structure with classification into respective categories, and is presented to the client in response to a request from the client. The client can obtain desired content on the basis of a content URL led from the content list.

[Hardware Configuration of Information Processing Devices Constituting Server and Client]

Finally, an example of a hardware configuration of the information processing devices to execute the above-described processes is described with reference to FIG. 18. A CPU (Central Processing Unit) 501 corresponds to the control units of the server and the client described above with reference to FIG. 17 and controls the various processes described in the above embodiment. The CPU 501 executes processes in accordance with a computer program stored in a data storing unit, such as a ROM 502 or an HDD 511.

The ROM (Read Only Memory) 502 stores programs, operation parameters, and so on used by the CPU 501. A RAM (Random Access Memory) 503 stores programs used in execution by the CPU 501, parameters that change as necessary in the execution, and so on. Those units are mutually connected via a host bus 504 constituted by a CPU bus or the like.

The host bus 504 connects to an external bus 506, such as a PCI (Peripheral Component Interconnect/Interface) bus, via a bridge 505. An input unit 508 and an output unit 509 correspond to the user interface (UI) in the client, for example.

The HDD (Hard Disc Drive) 511 includes a hard disc, drives the hard disc, and records or reproduces the program executed by the CPU 501 and information. The hard disc is used as means for storing content, metadata, and a content list, for example. Furthermore, various computer programs, such as a data processing program, are stored therein.

A drive 512 reads data or a program recorded on a removable medium 521 loaded thereto, such as a magnetic disk, an optical disc, a magneto-optical disc, or a semiconductor memory, and supplies the data or program to the RAM 503 connected via an interface 507, the external bus 506, the bridge 505, and the host bus 504.

A connection port 514 is a port to connect an external connected device 522 and has a connection unit, such as a USB or IEEE 1394. The connection port 514 connects to the CPU 501 and so on via the interface 507, the external bus 506, the bridge 505, and the host bus 504. The communication unit 515 connects to a network and executes a communication process between the server and the client.

The example of the hardware configuration of the information processing device illustrated in FIG. 18 is an example of a device configured by applying a PC. Not only the configuration illustrated in FIG. 18, but also various devices capable of executing the processes described in the above embodiment can be applied.

The present invention has been described in detail with reference to the specific embodiment. However, it is obvious that those skilled in the art can achieve modifications or substitutions of the embodiment without deviating from the scope of the present invention. That is, the present invention has been disclosed in the form of an example and should not be interpreted in a limited manner. The claims should be considered to determine the scope of the present invention.

The series of processes described in the description can be executed by hardware, software, or a composite configuration of hardware and software. In the case where the processes are executed by software, a program containing the process sequence can be executed by installing it to a memory in a computer incorporated in dedicated hardware or can be executed by installing it to a multi-purpose computer capable of executing various processes.

For example, the program can be recorded in advance in a hard disc or a ROM (Read Only Memory) as a recording medium. Alternatively, the program can be stored (recorded) temporarily or permanently in a removable recording medium, such as a flexible disk, a CD-ROM (Compact Disc Read Only Memory), an MO (magneto optical) disc, a DVD (Digital Versatile Disc), a magnetic disk, or a semiconductor memory. Such a removable recording medium can be provided as so-called package software.

The program can be installed to the computer from the above-described removable medium. Alternatively, the program can be wirelessly transferred from a download site to the computer or can be transferred through a wire to the computer via a network, such as a LAN (Local Area Network) or the Internet. The computer can receive the program transferred in that manner and install it to a recording medium, such as a hard disc provided therein.

Additionally, the various processes described in the description may be executed in parallel or individually in accordance with the processing ability of the device executing the processes or as necessary, in addition to being executed in time series according to the description. Also, the system in this description means a logical group configuration of a plurality of devices and is not limited to devices of respective configurations placed in the same casing.

INDUSTRIAL APPLICABILITY

As described above, according to the configuration of an embodiment of the present invention, when a process of uploading content from a client to a server is executed between the client and the server mutually connected via a network, the client obtains storage destination identifiers corresponding to storage means included in the server from the server, and outputs a content storage request including the storage destination identifier corresponding to the storage means desired by the client to the server. The server obtains the storage destination identifier included in the content storage request received from the client, selects the storage means specified by the storage destination identifier, and stores the content uploaded from the client. With this configuration, the client can arbitrarily specify specific storage means of the server and allow the content to be recorded.

The invention claimed is:

1. An information processing device to execute a content storing process via a network to a server having a CDS (Content Directory Service) function of executing content management by using a content managing directory having a hierarchical structure, the information processing device comprising:
 a communication unit to execute data communication;
 a processor, and
 a memory coupled to the processor,
 wherein the memory is encoded with one or more instructions that, when executed by the processor, define
 a control unit to execute a process of receiving, from the server via the communication unit, storage means information including a plurality of storage destination identifiers, each storage destination identifier specifying a separate storage means from a plurality of storage means included in the server, and to transmit a content storage request including one storage destination identifier that includes a content storage destination that specifies a selected storage means and content to be stored to the specified storage means on the server;

wherein the CDS holds a content list having a hierarchical structure based on metadata corresponding to content type; and wherein the plurality of storage means comprise a plurality of different types of non-transitory storage media.

2. The information processing device according to claim 1, characterized in that the control unit is configured to execute a process to transmit, to the server, information to allow the server to associate the content transmitted to the server with a container on the managing directory of the CDS.

3. An information processing device to execute a content storing process via a network to a server having a CDS (Content Directory Service) function of executing content management by using a content managing directory having a hierarchical structure, the information processing device comprising:

a communication unit to execute data communication;
a processor, and
a memory coupled to the processor,
wherein the memory is encoded with one or more instructions that, when executed by the processor, define
a control unit to execute a process of receiving, from the server via the communication unit, storage means information including a plurality of storage destination identifiers, each storage destination identifier specifying a separate storage means from a plurality of storage means included in the server, and to transmit a content storage request including one storage destination identifier including a content storage destination that specifies a selected storage means and content to be stored to the specified storage means on the server, wherein the CDS holds a content list having a hierarchical structure based on metadata corresponding to content type; and wherein the plurality of storage means comprise a plurality of different types of non-transitory storage media.

4. The information processing device according to claim 1, characterized in that the control unit is configured to execute a process to obtain content storage destination specifying information that is recorded as registered information in a storage unit, creating the content storage request including the storage destination identifier corresponding to the obtained registered information, and to transmit the content storage request to the server.

5. The information processing device according to claim 1, characterized in that the control unit is configured to execute a process to create display information including the storage means information based on the storage means information received from the server and displaying the display information on a display unit.

6. The information processing device according to claim 1, characterized in that the control unit is configured to execute a process to create display information including storage means names included in the storage means information received from the server and to display the display information in a display unit.

7. The information processing device according to claim 1, characterized in that the control unit is configured to execute a process to display a warning on a display unit based on no-medium-set state information to the storage means included in the storage means information received from the server.

8. The information processing device according to claim 1, characterized in that the control unit is configured to execute a process to compare available capacity of at least one of the storage means included in the storage means information received from the server with the amount of content to be stored and to execute a process to display a warning on a display unit if the available capacity compared to the storage means is equal to or smaller than the amount of content to be stored.

9. The information processing device according to claim 1, characterized in that the information processing device is a receiver configured to receive broadcasted content and to output the received content to the server as a recorder, and that the control unit is configured to execute processes of starting and stopping output of the received content to the recorder in accordance with pre-registered information about estimated time to start and end recording of the broadcasted content to be recorded.

10. The information processing device according to claim 1, characterized in that the information processing device is a receiver configured to receive broadcasted content and to output the received content to the server as a recorder, and that the control unit is configured to compare the amount of the broadcasted content to be recorded with available capacity of at least one of the storage means included in the storage means information received from the recorder and to execute display a warning on a display unit if the available capacity of the storage means is equal to or smaller than the amount of content to be stored.

11. An information processing device as a server to execute a process in response to a content storage request from a client via a network, the information processing device comprising:

a communication unit to execute data communication;
a processor, and
a memory coupled to the processor,
wherein the memory is encoded with one or more instructions that, when executed by the processor, define
a control unit to execute a CDS (Content Directory Service) function to perform content management by using a content managing directory having a hierarchical structure based on metadata corresponding to content type, and
wherein the control unit is also configured to execute a content storing process by receiving the content storage request including a storage destination identifier that includes a content storage destination that specifies a selected storage means from a plurality of storage means included in the server, from the client via the communication unit and to select the storage means specified by the storage destination identifier as a storage destination of content transmitted from the client, and wherein the plurality of storage means comprise a plurality of different types of non-transitory storage media.

12. The information processing device according to claim 11, characterized in that the control unit is configured to execute a process to transmit, to the client, storage means information including the plurality of storage destination identifiers in accordance with receipt of a storage means information obtaining request from the client.

13. The information processing device according to claim 11, characterized in that the control unit is configured to execute a process to transmit, to the client, storage means information including information about the plurality of different types of non-transitory storage media that can be set to the storage means included in the server and information about a current medium that is set in the storage means in accordance with receipt of a storage means information obtaining request from the client.

14. The information processing device according to claim 11, characterized in that the control unit is configured to execute a process to transmit, to the client, storage means information including information about a capacity of a medium set in the selected storage means included in the server in accordance with receipt of a storage means information obtaining request from the client.

15. The information processing device according to claim 11, characterized in that the information processing device is a recorder and the client is a receiver configured to receive broadcasted content and to output the received content to the server as the recorder, and that the control unit is configured to execute processes of starting and stopping input of content from the receiver in accordance with pre-registered information about estimated time to start and end recording of the broadcasted content to be recorded.

16. An information processing method in an information processing device to execute a content storing process via a network to a server having a CDS (Content Directory Service) function of executing content management by using a content managing directory having a hierarchical structure, the information processing method being characterized in comprising:

a storage means information inputting step of inputting, in a control unit, storage means information that is received from the server via a communication unit and that includes a plurality of storage destination identifiers, each storage destination identifier specifying a separate storage means from a plurality of storage means included in the server; and a data transmitting step of executing, in the control unit, a process of transmitting a content storage request including at least one storage destination identifier that includes a content storage destination that specifies a selected storage means in the plurality of storage means and content to be stored to the specified storage means on the server via the communication unit;

wherein the CDS holds a content list having a hierarchical structure based on metadata corresponding to content type; and wherein the plurality of storage means comprise a plurality of different types of non-transitory storage media.

17. The information processing method according to claim 16, wherein the data transmitting step includes a step of executing a process of transmitting, to the server, information to allow the server to associate the content transmitted to the server with a container on the managing directory of the CDS.

18. The information processing method according to claim 16, wherein the data transmitting step includes executing a process of creating the content storage request including the at least one storage destination identifier directly corresponding to the selected storage means on the basis of input of content-storage destination specifying information via an input unit and transmitting the content storage request to the server.

19. The information processing method according to claim 16, wherein the data transmitting step includes executing a process of obtaining content storage destination specifying information that is recorded as registered information in a storage unit, creating the content storage request including the storage destination identifier corresponding to the obtained registered information, and transmitting the content storage request to the server.

20. The information processing method according to claim 16, further comprising a display step of executing, in the control unit, a process of creating display information including the storage means information on the basis of the storage means information received from the server and displaying the display information in a display unit.

21. The information processing method according to claim 16, further comprising a display step of executing, in the control unit, a process of creating display information including storage means names included in the storage means information received from the server and displaying the display information in a display unit.

22. The information processing method according to claim 16, further comprising a display step of executing, in the control unit, a process to display of a warning on a display unit based on no-medium-set state information to the storage means included in the storage means information received from the server.

23. The information processing method according to claim 16, further comprising a display step of executing, in the control unit, a process to compare available capacity of at least one of the storage means included in the storage means information received from the server with the amount of content to be stored and a process to display a warning on a display unit if the available capacity compared to the storage means is equal to or smaller than the amount of content to be stored.

24. The information processing method according to claim 16, wherein the information processing device is a receiver configured to receive broadcasted content and to output the received content to the server as a recorder, and that the control unit executes processes of starting and stopping output of the received content to the recorder in accordance with pre-registered information about estimated time to start and end recording of the broadcasted content to be recorded.

25. The information processing method according to claim 16, wherein the information processing device is a receiver configures to receive broadcasted content and to output the received content to the server as a recorder, and that the control unit compares the amount of the broadcasted content to be recorded with available capacity of the storage means included in the storage means information received from the recorder and executes display of a warning to a display unit if the available capacity of the storage means is equal to or smaller than the amount of content to be stored.

26. An information processing method executed in an information processing device as a server to execute a process in response to a content storage request from a client via a network, the information processing method being characterized in comprising:

a content storage request receiving step of receiving, in a communication unit, a content storage request from the client, the content storage request including a storage destination identifier that includes a content storage destination that specifies a selected storage means from a plurality of storage means included in the server;

a content storing step of selecting the storage means specified by the storage destination identifier as a storage destination of content transmitted from the client and executing a process of storing the content received from the client in a control unit; and a step of associating, in the control unit, the content received from the client with a content managing directory in accordance with a CDS (Content Directory Service) function to execute content management by using the content managing directory having a hierarchical structure based on metadata corresponding to content type; and wherein the plurality of storage means comprise a plurality of different types of non-transitory storage media.

27. The information processing method according to claim 26, further comprising a storage means information transmitting step of transmitting, to the client, storage means information including the plurality of storage destination identifiers in accordance with receipt of a storage means information obtaining request from the client in the control unit.

28. The information processing method according to claim 26, further comprising a storage means information transmitting step of transmitting, to the client, storage means information including information about the plurality of different types of non-transitory storage media that can be set to the storage means included in the server and information about a current medium that is set in the storage means in accordance with receipt of a storage means information obtaining request from the client in the control unit.

29. The information processing method according to claim 26, further comprising a storage means information transmitting step of transmitting, to the client, storage means information including information about capacity of a medium set in the selected storage means included in the server in accordance with receipt of a storage means information obtaining request from the client in the control unit.

30. The information processing method according to claim 26, wherein the information processing device is a recorder and the client is a receiver configured to receive broadcasted content and to output the received content to the server as the recorder, and that the control unit executes processes of starting and stopping input of content from the receiver in accordance with pre-registered information about estimated time to start and end recording of the broadcasted content to be recorded.

31. A non-transitory computer-readable medium containing a program, which, when executed by a processor, causes a computer to perform a content storing process via a network to a server having a CDS (Content Directory Service) function of executing content management by using a content managing directory having a hierarchical structure, the program comprising the steps of:

a storage means information inputting step of inputting, in a control unit, storage means information that is received from the server via a communication unit and that includes a plurality of storage destination identifiers, each storage destination identifier including a content storage destination that specifies a separate storage means from a plurality of storage means included in the server; and a data transmitting step of executing, in the control unit, a process of transmitting a content storage request including at least one storage destination identifier that specifies a selected storage means and content to be stored to the specified storage means on the server via the communication unit, wherein the CDS holds a content list having a hierarchical structure based on metadata corresponding to content type; and wherein the plurality of storage means comprise a plurality of different types of non-transitory storage media.

32. A non-transitory computer-readable medium containing a program, which, when executed by a processor, causes a computer to perform a process in response to a content storage request from a client via a network, the program comprising the steps of:

a content storage request receiving step of receiving, in a communication unit, a content storage request from the client, the content storage request including a storage destination identifier, which specifies a selected storage means from a plurality of client-selectable storage means included in the server;

a content storing step of selecting the storage means specified by the storage destination identifier as a storage destination of content transmitted from the client and executing a process of storing the content received from the client in a control unit; and a step of associating, in the control unit, the content received from the client with a content managing directory in accordance with a CDS (Content Directory Service) function to execute content management by using the content managing directory having a hierarchical structure based on metadata corresponding to content type; and wherein the plurality of storage means comprise a plurality of different types of non-transitory storage media.

* * * * *